United States Patent [19]
Dague et al.

[11] Patent Number: 5,746,919
[45] Date of Patent: May 5, 1998

[54] TEMPERATURE-PHASED ANAEROBIC WASTE TREATMENT PROCESS

[75] Inventors: Richard R. Dague, Ames, Iowa; William L. Harris, Gilbert, Ariz.; Sandra K. Kaiser, Cincinnati, Ohio

[73] Assignee: Iowa State University Research Foundation, Inc., Ames, Iowa

[21] Appl. No.: 656,607

[22] Filed: May 31, 1996

Related U.S. Application Data

[63] Continuation-in-part of Ser. No. 316,860, Oct. 3, 1994, Pat. No. 5,525,228, which is a continuation of Ser. No. 124,871, Sep. 23, 1993, abandoned.

[51] Int. Cl.⁶ ............................................. C02F 11/04
[52] U.S. Cl. ......................... 210/603; 210/612; 210/617
[58] Field of Search .............................. 210/603, 612, 210/616, 617

[56] References Cited

U.S. PATENT DOCUMENTS

| | | | |
|---|---|---|---|
| 4,321,141 | 3/1982 | Messing | 210/603 |
| 4,351,729 | 9/1982 | Witt | 210/603 |
| 4,551,250 | 11/1985 | Motper et al. | 210/603 |
| 4,735,724 | 4/1988 | Chynoweth et al. | 210/603 |
| 5,228,995 | 7/1993 | Stover | 210/603 |

*Primary Examiner*—Thomas G. Wyse
*Attorney, Agent, or Firm*—Henderson & Sturm

[57] ABSTRACT

A method of treating a waste stream including the steps of feeding the stream through a thermophilic anaerobic reactor and then a mesophilic anaerobic reactor operated in series.

29 Claims, 9 Drawing Sheets

NOTE: TOTAL VOLUME OF EACH SYSTEM IS THE SUM OF THE VOLUMES GIVEN

TEMPERATURE-PHASED ANAEROBIC WASTE TREATMENT PROCESS

RELATED APPLICATIONS

The present application is a continuation-in-part of U.S. patent application Ser. No. 08/316,860 filed Oct. 3, 1994, now U.S. Pat. No. 5,525,228; U.S. patent application Ser. No. 08/316,860 was a continuation of U.S. patent application Ser. No. 08/124,871 filed Sep. 23, 1993, now abandoned; the above-identified U.S. Patent and Patent Applications are incorporated herein by reference.

TECHNICAL FIELD

This invention relates to anaerobic treatment of wastes, and more particularly to a temperature-phased anaerobic process.

BACKGROUND ART

Anaerobic biological treatment has been in existence since the 1910's when it was first used for the treatment of municipal sewage sludge. Over the last twenty-five years, a number of new anaerobic processes have been developed for the treatment of industrial wastes, as well as for conventional sludge digestion.

Industrial waste pretreatment is becoming commonly viewed as a cost-savings measure by generating industries, in that it often costs less to pretreat wastes than to pay municipal sewer usage fees. Anaerobic processes are now being considered by many industries as an attractive alternative for industrial waste pretreatment.

The pioneering work on the anaerobic filter was performed at Stanford University by Young for his doctoral research under McCarty, and was presented in detail in 1969. [Young, J. C., and P. L. McCarty "The anaerobic filter for waste treatment." JWPCF, 41, 5, R 160–R 173 ( 1969)].

The first anaerobic filters were described by Young as completely submerged, 12-liter, laboratory-scale reactors which were filled with 1.0 to 1.5 inch quartzite stone (bed porosity of 0.42). The reactors were continuously-fed in a upflow mode at 25° C.

Two substrates were used, a mixture of proteins and carbohydrates, and a mixture of acetic and propionic acids. Waste strengths ranged from 1,500 mg/L to 6,000 mg/L at hydraulic retention times (HRTs) ranging from 4.5 hrs to 72 hrs, resulting in organic loadings ranging from 0.43 g COD/L/day to 3.40 g COD/L/day. Treatment success was based primarily on COD removals, based on measured influent and effluent CODs. COD removals ranged from a high of 93.4% at the 72 hr HRT at a loading of 0.43 g COD/L/day, to a low of 36.7% removal at the 4.5 hr HRT at a loading of 3.4 g COD/L/day.

From the initial research on the anaerobic filter, Young and McCarty stated several observations and advantages of the anaerobic filter as compared to other anaerobic treatment systems including:

1. The anaerobic filter is ideal for the treatment of soluble waste streams.
2. Biological solids accumulate in the anaerobic filter leading to long solids retention times (SRTs), and low effluent total suspended solids (TSS).
3. Because of the long SRTs possible, dilute wastes can be treated successfully at nominal temperatures (<37° C.).

Shortly after Young and McCarty's early work on the anaerobic filter, Plummer applied the anaerobic filter treatment process to an actual food processing waste, consisting mainly of carbohydrates. [Plummer, A. H., Jr., Maline, J. F., Jr., and W. W. Ekenfelder, Jr. "Stabilization of a low-solids carbohydrate waste by an anaerobic submerged filter." Proceedings of the 23rd Industrial Waste Conference, Purdue University, Lafayette, Ind. ( 1968)]. Instead of using rock packing media, Plummer used a plastic ring and saddle media. This provided a much higher filter bed porosity ( 0.70 porosity vs. 0.42) than was the case for Young's rock-filled filter. The higher bed porosity left more physical space in the reactor for the retention of anaerobic biomass.

Plummer's filters were operated mesophilically at organic loadings of 1.6 g COD/L/day to 10.3 g COD/L/day at HRTs ranging from 13 hrs to 83 hrs, resulting in COD removals ranging from 41 to 93.5%. To avoid the possibility of liquid short-circuiting, Plummer suggested effluent recycling.

The anaerobic filter process was applied to a pharmaceutical waste by Jennett and Dennis in 1975. [Jennett, J. C., and N. D. Dennis, Jr. "Anaerobic filter treatment of pharmaceutical waste." JWPCF, 47, 1, 104–121 ( 1975)]. The pharmaceutical waste was low in suspended solids and had an average COD of 16,000 mg/l. The reactors were filled with 1.0 to 1.5 inch gravel, and had a 14 liter empty bed volume. HRTs of 12 hrs to 48 hrs were studied at 37° C. and applied organic loadings ranging from 0.2 g COD/L/day to 3.5 g COD/L/day. COD removal efficiencies ranged from 94 to 98%. An important observation made by Jennet and Dennis was that bacteria collected on and between the interstitial spaces of the gravel media.

Chain and DeWalle utilized an anaerobic filter for the treatment of acidic landfill leachate which had a pH of 5.4 and a COD of 54,000 mg/L. [Chian, E. S. K., and DeWalle, F. B., "Treatment of High Strength Acidic Wastewaters with a Completely Mixed Anaerobic Filter." Water Research, Vol. 11 ( 1977)]. They practiced effluent liquid recycle in order to help neutralize the pH of the acidic leachate. They also used plastic media which provided for a high filter bed porosity of 0.94.

The anaerobic filter was used to treat shellfish processing wastewaters by Hudson. [Hudson, J. W., Pohland, F. G., and Pendergrass, R. P. "Anaerobic packed column treatment of shellfish processing wastewaters." Proceedings of the 34th Industrial Waste Conference, Purdue University, Lafayette, Ind. ( 1984)]. Two different types of packing media were used, including readily-available oyster shells and stone media, resulting in bed porosities of 0.82 and 0.53, respectively. This was an important study which illustrated how filter bed porosity may affect wastewater treatment. The oyster shell media filter with the higher bed porosity provided superior treatment as compared to the stone media, with COD removals of 81%.

In 1980, Dague reported on the use of anaerobic filters to treat a high-strength grain processing waste. [Dague, R. R. "Principles of anaerobic filter design." Presented at the 26th annual Great Plains Wastewater Design Conference, Omaha, Nebr., Mar. 23, 1982.] Two temperatures were utilized, 22° C. and 35° C., at applied organic loadings of 2.4 g COD/L/day. COD removal efficiencies were 75% at 22° C., and 90% at 35° C. The organic loading was increased to 5.6 g COD/L/day for the 35° C. filter, but treatment was unstable due to pH fluctuations in the raw waste.

Stevens and van den Berg used the anaerobic filter process to treat food processing wastes at 37° C. [Stevens, T. G., and L. van den Berg "Anaerobic treatment of food processing wastes using a fixed-film reactor." Proceedings of the 36th Industrial Waste Conference, Purdue University, Lafayette, Ind. (1981)]. Two wastes were utilized including a bean-blanching wastewater, and a caustic tomato-peeling wastewater, which was neutralized to a pH of 9.5 prior to anaerobic treatment.

The single filter was operated in the upflow mode with the bean-blanching waste and in the downflow mode with the bean-blanching waste and the tomato-peeling waste. Little change in treatment was observed when the filter was instantaneously switched from the bean-blanching waste to the tomato-peeling waste.

In 1984, Guiot and van den Berg described a modified anaerobic filter, termed the upflow blanket filter (UBF), or hybrid filter. [Guiot, S. R. and L. van den Berg "Dynamic performance of an anaerobic reactor combining an upflow sludge blanket and a filter for the treatment of sugar waste." Proceedings of the 39th Industrial Waste Conference, Purdue University, Lafayette, Ind. 1984]. In their design, the bottom two-thirds of the reactor consisted of an open space where a sludge blanket formed. The top one-third of the reactor contained conventional plastic media. They tested a synthetic waste consisting mainly of sucrose in which applied organic loadings of up to 22 g COD/L/day resulted in 95% soluble COD removal efficiencies.

Many more studies have been conducted using anaerobic filters. The anaerobic filter has been applied mainly to soluble waste streams using a variety of synthetic as well as actual industrial wastes.

There are no known two-stage anaerobic treatment processes in which a thermophilic anaerobic filter is connected in series to a mesophilic anaerobic filter. The majority of the relevant literature deals with two-stage systems designed for enhanced phase optimization.

In 1971, Pohland and Ghosh first proposed a two-phase system for the separation of the acidogenic and methanogenic phases of anaerobic treatment. [Pohland, F. G., and S. Ghosh "Developments in anaerobic stabilization of organic wastes—the two-phase concept." *Env. Letters*, 1, 4, 255–266 (1971)].

Their system consisted of two completely-mixed reactors connected in series for waste stabilization. They noted that by separating the acid-forming organisms from the methanogenic organisms, optimal growth environments could be maintained for each population. By the use of kinetic control using the appropriate dilution rates, they proposed that the rapid-growing acidogens would be predominate in the first stage, forming volatile acids. The slower-growing methanogens would be washed out of the first stage and predominate in the second stage where they could convert volatile acids produced in the first stage to methane gas. They noted that the key to successful treatment was near-complete phase separation.

In 1985, Ghosh compared the two-stage process to single-stage digestion for the anaerobic treatment of sewage sludge. [Ghosh, S. "Improved sludge gasification by two-phase anaerobic digestion." *J. Env. Eng.*, 113, 1265–1284 (1985)]. Continuously-mixed reactors were used, and temperature variations of mesophilic to mesophilic, mesophilic to thermophilic, and thermophilic to thermophilic were applied for the first and second stages, respectively. Ghosh noted that the two-stage systems showed superior performance when compared to the single-stage system, especially at high organic loadings and low HRTs.

Tanaka and Matsuo treated a dilute milk waste stream using a two-stage system which consisted of a continuously-mixed reactor connected in series to a methanogenic anaerobic filter at 37° C. [Tanaka, S. and T. Matsuo "Treatment characteristics of the two phase anaerobic digestion system using an upflow filter." *Wat. Sci. Tech* 18, 217–224 (1986)]. At a system HRT of 4.4 days, 92% COD removals were achieved at a low organic loading of 1.5 g COD/L/day. They observed more successful phase separation when the acidogenic continuously-mixed reactor was operated at a 1-day HRT rather than a 2-day HRT. In an analysis of the acidogenic effluent from the first stage, it was observed that carbohydrates were more readily degraded than the proteins or lipids present in the milk waste stream.

In 1986, Lo and Liao were the first to utilize the two-stage process for an agricultural waste, screened dairy manure. [Lo, K. V., and P. H. Liao "Thermophilic anaerobic digestion of screened dairy manure using a two-phase process." *Energy in Agriculture*, 5, 249–255 (1986)]. They compared one-stage and two-stage systems at 55° C. The two-stage system consisted of a 6-liter completely-mixed reactor operated at HRTs of 1.3 to 1.5 days connected to a 4-liter anaerobic filter operated at a 1-day HRT. The single-stage system consisted of a 4-liter anaerobic filter operated at a 1-day HRT. Better performance was observed in the single-stage system for the screened dairy manure.

In 1990, Hanaki and others compared single-stage and two-stage anaerobic treatment of an oily cafeteria wastewater at 20° C. [Hanaki, K. Matsuo, T., and K. Kumazaki "Treatment of oily cafeteria wastewater by single-phase and two phase anaerobic filter." *Wat. Sci. Tech.*, 22 3/4, 299–306 (1990)]. Similar to previous research, the two stage system consisted of a completely-mixed reactor connected in series to an anaerobic filter. The cafeteria wastewater contained approximately 30% lipids, and had a COD of 1,300 mg/L to 2,500 mg/L. Slightly better COD removals were observed in the single-stage filter as compared to the two-stage system.

Aoki and Kawase reported on the use of a two-stage process at a thermophilic temperature to digest sewage sludge. [Aoki, N., and M. Kawase "Development of high-performance thermophilic two-phase digestion process." *Wat. Sci. Tech.*, 23, 1147–1156 (1991)]. Their research was slightly different in that a thermal conditioning pretreatment step was applied at 90° C. for one hour using a proteolytic enzyme. The two-stage system consisted of a 70° C. completely-mixed acidogenic reactor connected to a 55° C. anaerobic filter. Their system obtained a 58% volatile solids reduction at a system HRT of 3.7 days.

Other reports in the literature deal with multi-stage designs which were not developed for phase optimization.

In 1973, El-Shafie and Bloodgood described an experiment in which six anaerobic filters were connected in series for the treatment of Metrecal (vanilla flavor) at 30° C. [El-Shafie, A., and D. E. Bloodgood "Anaerobic treatment in a multiple upflow filter system." *JWPCF*, 45 11, 2345–2357 (1973)].

In their system, the six reactors were filled with 1 to 1.5 inch gravel media and had a working volume of 2.6 liters each. The Metrecal waste stream had a COD of 10,000 mg/l, and was applied at the rate of 1 liter per hour, resulting in an effective load on the first anaerobic filter of 41 g COD/L/day. The retention time in each of the six filters was three hours, resulting in a system HRT of 18 hours for the combined six filters. System COD removals averaged 76%. El-Shafie and Bloodgood observed that there was an exponential decrease in biological activity from the first to the last filter.

Howerton and Young investigated a unique two-stage cyclic operation of anaerobic filters using a synthetic alcohol stillage waste comprised mainly of ethanol and sucrose. [Howerton, D. F., and J. D. Young "Two-stage cyclic operation of anaerobic filters." *JWPCF*, 59, 8, 788, 794 (1987)].

In their system, two 370-liter anaerobic filters were connected in series, with the first reactor termed the lead reactor, and the second reactor termed the follow reactor. As a part of their study, after 136 days of continuous operation of the filters at 30° C., the waste flow was reversed, with the follow reactor becoming the lead reactor. At organic loadings of 4 g COD/L/day and 8 g COD/L/day, using system HRTs of 36 hrs and 18 hrs, COD removals of 98% to 99% were observed.

At Iowa State University, Harris conducted a comparative study of mesophilic and thermophilic anaerobic filters for his doctoral research under Dague. [Harris, W. L. Comparative performance of anaerobic filters at mesophilic and thermophilic temperatures." Doctoral dissertation, Library, Iowa State University (1992)].

The laboratory-scale anaerobic filters had clean-bed volumes of 16.8 liters. Non-fat dried milk was used as the substrate. The mesophilic and thermophilic filters were operated at 35° C. and 56° C., respectively. Harris observed that the thermophilic reactors produced a lower quality effluent than the mesophilic reactors at high organic loadings.

The recent 40 CFR Part 503 Standards for the Disposal of Sewage Sludge [American Public Health Association, (1980) Standard Method for the Examination of Water and Wastewater, 15th Edition, Washington, D.C.] outline stringent pathogen requirements for wastewater treatment plants that desire to sell or give away biosolids for application to land. Land application of Class A biosolids requires that fecal coliforms be less than 1000 most probable number per gram of total solids (MPN/g TS). Many wastewater treatment plants using conventional anaerobic digesters operated at temperatures near 35° C. with HRTs ranging from 12 to 30 days will not be capable of meeting the fecal coliform requirements for Class A biosolids.

Thermophilic anaerobic digestion is an alternative approach that has advantages over mesophilic digestion in terms of pathogen destruction. A single-stage thermophilic anaerobic system [Garber, W. F. (1977) "Certain aspects of anaerobic digestion of wastewater solids in the thermophilic range at the Hyperion Treatment Plant." Progress of Water Technology, 8(6), 401–406] and a thermophilic two-phase system [Lee, K. M., Brunner, C. A., Farrel, J. B., and Eralp, A. E. (1989) Destruction of Enteric Bacteria and Viruses during Two-Phase Digestion. Journal Water Pollution Control Federation, Vol. 61, No. 8, 1421–1429] were used and both systems achieved a much higher reduction of pathogens than a mesophilic anaerobic digester. But these processes could not avoid the disadvantages of thermophilic anaerobic digestion. The volatile fatty acids (VFA) are high in the effluent [Rudlofs, W. And Heukelekian, H. (1930) Thermophilic Digestion of Sewage Solids. Industrial and Engineering Chemistry, 22, 96, 234–241; Fisher, A. J., and Greene, R. A. (1945) Plant scale tests on thermophilic digestion. Sewage Works Journal, 17, 718–729] and odors are more pronounced than for mesophilic systems. Also, shock loadings or temperature changes can lead to unstable conditions in thermophilic processes, even to failure [Garber, W. F., Ohara, G. T., Colbaugh, J. E., and Raksit, S. K. (1975) Thermophilic digestion at the Hyperion Treatment Plant. Journal Water Pollution Control Federation, 47, No. 5, 950–961; Garber, W. F. (1977) Certain aspects of anaerobic digestion of wastewater solids in the thermophilic range at the Hyperion Treatment Plant. Progresses of Water Technology, 8, No. 6, 401–406].

Most wastewater treatment plants in the U.S. employing anaerobic digestion use common tanks for the digestion of mixtures of primary and biological sludge. The volatile solids (VS) reduction rate is slowed by even small additions of biological solids, particularly waste activated sludge (WAS). The WAS is a dilute suspension of microbial cells and cell debris. Because the potential substrates are "membrane-enclosed" within viable cells, WAS becomes more difficult to degrade, compared with primary sludge (PS). Two serious problems are commonly encountered in the application of conventional mesophilic anaerobic digestion of WAS: low volatile solids destruction and foaming. The digestibility of WAS may be one-half of that of raw primary sludge [Zack, S. I., and Edwards, G. P. (1929) "Gas Production from Sewage Sludge." Sewage Works Journal, 1, 160]. Nearly two-thirds of the activated sludge plants in the United States have foaming problems [Pitt, P. A., and Jenkins, D. (1988) "Causes and control of Nocardia in Activated Sludge." Paper presented at the Annual Meeting of Water Pollution Control Federation, Dallas, Tex.]. Another problem for conventional mesophilic digestion is low pathogen destruction. Such digesters generally can not meet the fecal coliform requirements of the recent 40 CFR Part 503 Standards for Class A biosolids.

Thermophilic anaerobic digestion has been found to achieve much higher pathogen destruction and to enhance hydrolysis of the complex biological materials in WAS [Garber, W. F. (1977) "Certain aspects of anaerobic digestion of wastewater solids in the thermophilic range at the Hyperion Treatment Plant." Progress of Water Technology, 8(6), 401–406; Lee, K. M., Brunner, C. A., Farrell, J. B., and Eralp, A. E. (1989) "Destruction of enteric bacteria and viruses during two-phase digestion." Journal Water Pollution Control Federation, 61(8), 1421–1429]. Foaming is also reduced significantly in thermophilic digestion [Rimkus, R. R., Ryan, J. M., and Cook, E. J. (1982) "Full-scale thermophilic digestion at the West-Southwest Sewage Treatment Works, Chicago, Ill." Journal Water Pollution Control Federation, 54 (11), 1447–1457]. But thermophilic anaerobic digestion is thought to be sensitive to changes in some parameters, such as temperature and VS loading. Also, volatile fatty acids (VFA) are high in the effluent from thermophilic digestion, which causes offensive odors [Rudlolfs, W., and Heukelekian, H. (1930) "Thermophilic digestion of sewage solids." Industrial and Engineering Chemistry, 22, 96, 234–241; Fisher, A. J., and Greene, R. A. (1945) "Plant scale tests on thermophilic digestion", Sewage Works Journal, 17, 718–729].

DISCLOSURE OF THE INVENTION

The present invention provides a method of treating a waste stream including the steps of feeding the stream through a thermophilic anaerobic reactor and then a mesophilic anaerobic reactor operated in series.

An object of the present invention is the provision of an improved method of biologically treating a waste stream.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

The following examples are illustrative of the best mode for carrying out the invention. They are obviously not to be construed as limitative of the invention since various other embodiments can readily be evolved in view of the teachings provided herein.

EXAMPLE 1

During Applicants' research comparing the performance of upflow anaerobic biofilters operated at temperatures of 35° C. and 56° C. [Harris, W. L. "Comparative performance of anaerobic filters at mesophilic and thermophilic temperatures." Doctoral dissertation, Library, Iowa State University (1992)], the thermophilic reactors tended to produce a lower quality effluent than the mesophilic reactors, especially at higher organic loadings. It was observed that the concentrations of volatile acids in the effluent of the thermophilic reactors was high when the COD load was in excess of 25 g/L/day. These high effluent volatile acids, of course, are reflected in a declining COD removal efficiency in the thermophilic reactors.

As a result of the poor effluent quality from the thermophilic biofilters, it was decided to operate the reactors in series (thermophilic followed by mesophilic) to determine whether or not such operation would result in increased removals of the high concentrations of volatile acids in the thermophilic effluent. This mode of operation resulted in a dramatic increase in the overall performance of the anaerobic biofilter system with COD removal efficiencies approaching 100%.

Figure 1:
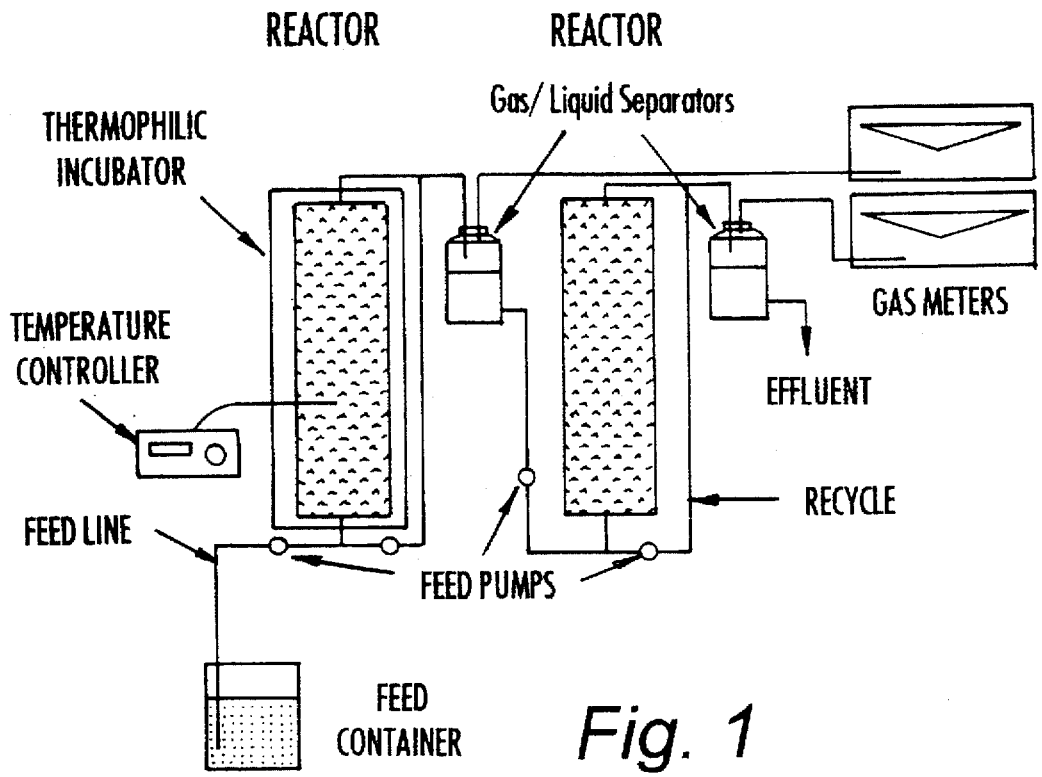
FIG. 1 is a schematic illustration of the temperature-phased anaerobic reactor system used to carry out the method of the present invention.

The initial research on the temperature-phased anaerobic biofilter (TPAB) process was conducted using two laboratory-scale anaerobic biofilters (FIG. 1), each having a clean-bed volume of 16.8 liters. The reactors were fed a synthetic substrate made from non-fat dry milk supplemented with essential nutrients and trace metals. The reactors were operated continuously in the upflow mode with the effluent from the thermophilic unit being fed into the mesophilic unit. The temperatures of the thermophilic and mesophilic reactors were maintained at 56° C. and 35° C., respectively. It is to be understood that the thermophilic reactor could be operated in the range of about 45° C. to 75° C. and that mesophilic reactor could be operated in the range of about 20° C. to 45° C. Overall system hydraulic retention times (HRTs) of 24 hr and 48 hr were studied. System organic loadings ranged from 4.13 to 24.75 g COD/L/day. The effective loading range on the first-stage thermophilic reactor was 8.26 to 49.5 g COD/L/day.

The reaction conditions include the presence of a mixed consortium of anaerobic microorganisms such as hydrolytic, acetogenic and methanogenic bacteria.

The thermophilic first stage (56° C.) receives raw organic waste and is capable of both organic matter conversion to simpler organic fatty acids, and to some degree organic matter stabilization to methane.

The mesophilic second phase (35° C.) can be thought of as a polishing step. Organic matter present mainly as simple organic fatty acids received from the first stage are converted into methane gas, providing for complete waste stabilization. The result is a superior effluent, low in organic matter and suspended solids.

Figure 2:
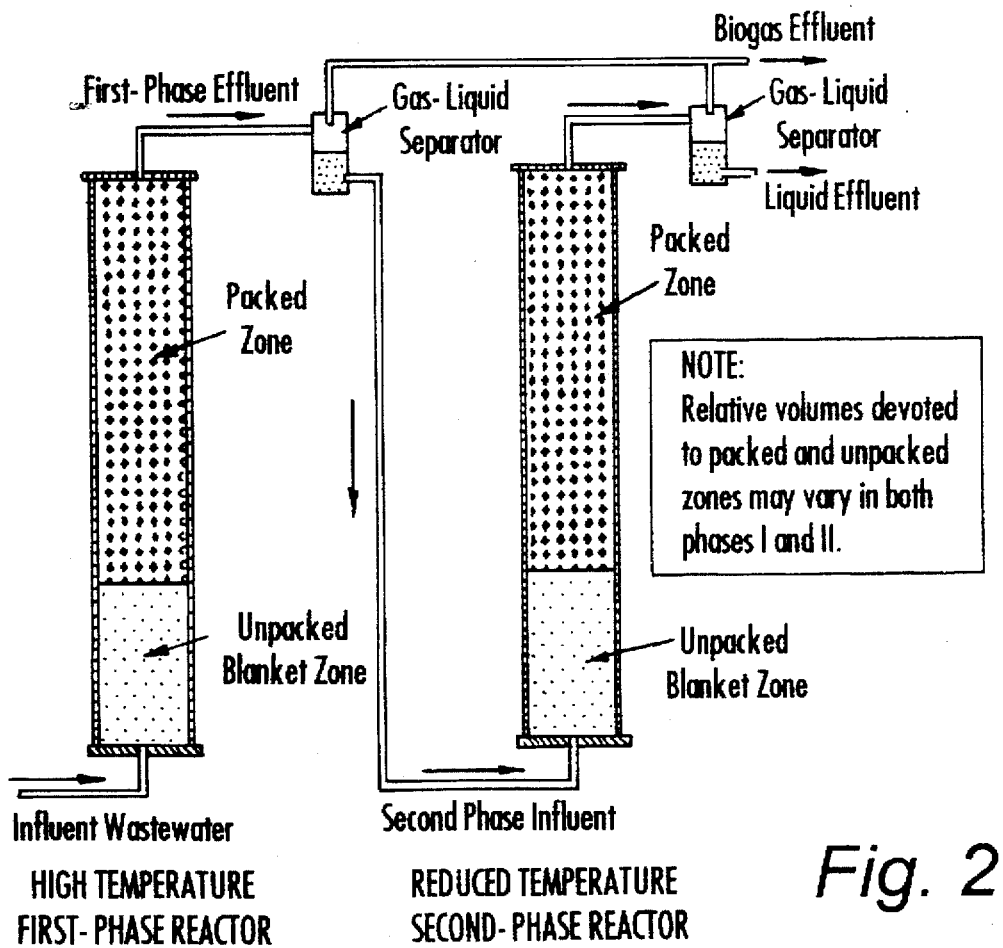
FIG. 2 is a schematic illustration of an alternate reactor system using hybrid columns.
Figure 3:
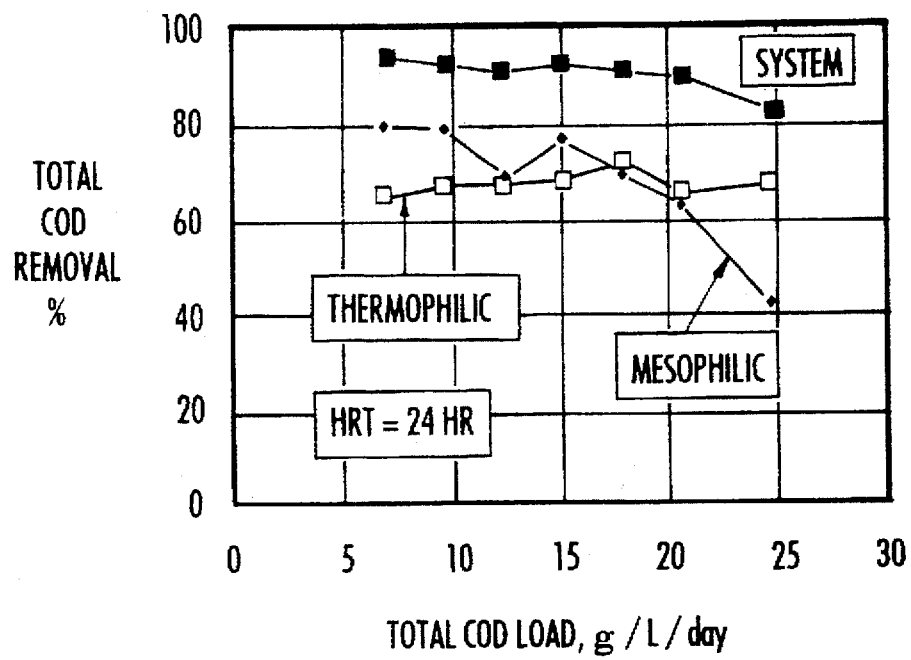
FIG. 3 is a graphical representation of the system performance at a twenty-four hour hydraulic retention time.
Figure 4:
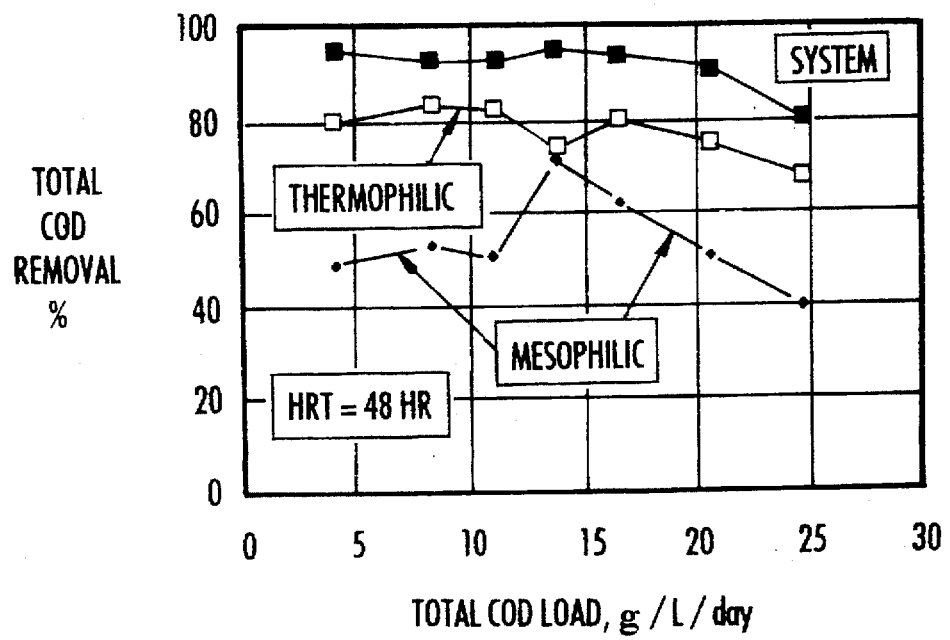
FIG. 4 is a similar graphical representation at a forty-eight hour hydraulic retention time.

Superior treatment performance was observed at both the 24 hr and 48 hr HRTs, as shown in FIGS. 3 and 4. System total COD removals of 90% or higher were observed at system loadings up to 20 g COD/L/day. For the 48 hr HRT system, the 20 g COD/L/day loading corresponds to an influent COD concentration of 40,000 mg/L. This illustrates the capability of the TPAB process to successfully treat very high strength wastes. FIG. 2 depicts a system using hybrid columns as an alternate to the fully packed columns depicted in FIG. 1.

EXAMPLE 2

As a result of these positive findings, the decision was made to expand the study to evaluate the performance of laboratory anaerobic filters operated in the thermophilic-mesophilic series mode for a variety of hydraulic retention times (HRT) and organic loadings.

Figure 5:
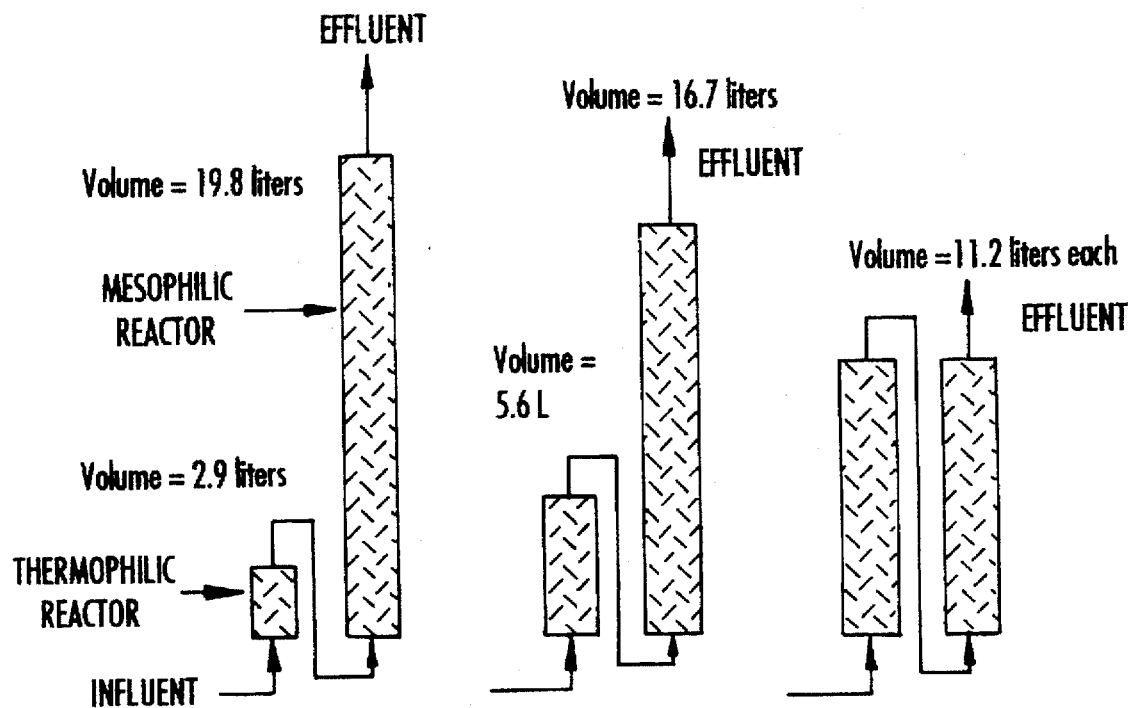
FIG. 5 is a schematic view illustrating three systems having varying hydraulic retention times wherein each system has the same HRT but mesophilic and thermophilic stages have varying HRTs.

As a part of the expanded study, three new laboratory reactor systems were constructed with relative volumes of the thermophilic and mesophilic reactors selected to enable the evaluation of a range of organic loadings and HRTs and to evaluate the optimum size ratio between the thermophilic and mesophilic stages. The three reactor systems are illustrated in FIG. 5. The total empty-bed volume of the systems (thermophilic plus mesophilic) ranged from 22.3 L to 22.7 L. The ratios of the thermophilic/mesophilic reactor volumes were different for each system. This enabled the variation of COD load on the first-stage thermophilic reactors while feeding exactly the same volume and substrate COD concentration to each system. The HRTs in the thermophilic and mesophilic phases as well as for the total system are shown in Table 1.

TABLE 1

Hydraulic retention times for the three TPAB Systems.

| System HRT hours | Thermophilic Stage hours (volume, L) | Mesophilic Stage hours (volume, L) |
|---|---|---|
| 24 | 3 (2.9) | 21 (19.8) |
|  | 6 (5.6) | 18 (16.7) |
|  | 12 (11.2) | 12 (11.2) |
| 48 | 6 (2.9) | 42 (19.8) |
|  | 12 (5.6) | 36 (16.7) |
|  | 24 (11.2) | 24 (11.2) |

The COD loadings evaluated for the total system and for the thermophilic reactors in the systems are shown in Table 2.

TABLE 2

COD loadings for the three TPAB systems and for the thermophilic first stage. (System HRT = 48 hr.)
Organic Loadings, g COD/L/day

| Total System | First-Phase Thermophilic Reactors | | |
|---|---|---|---|
|  | No. 1 (2.9 L) (6 hr HRT) | No. 2 (5.6 L) (12 hr HRT) | No. 3 (11.2 L) (24 hr HRT) |
| 1 | 8 | 4 | 2 |
| 2 | 16 | 8 | 4 |
| 3 | 24 | 12 | 6 |
| 4 | 32 | 16 | 8 |
| 5 | 40 | 20 | 10 |
| 6 | 48 | 24 | 12 |
| 7 | 56 | 28 | 14 |
| 8 | 64 | 32 | 16 |
| 9 | 72 | 36 | 18 |
| 10 | 80 | 40 | 20 |

Figure 6:
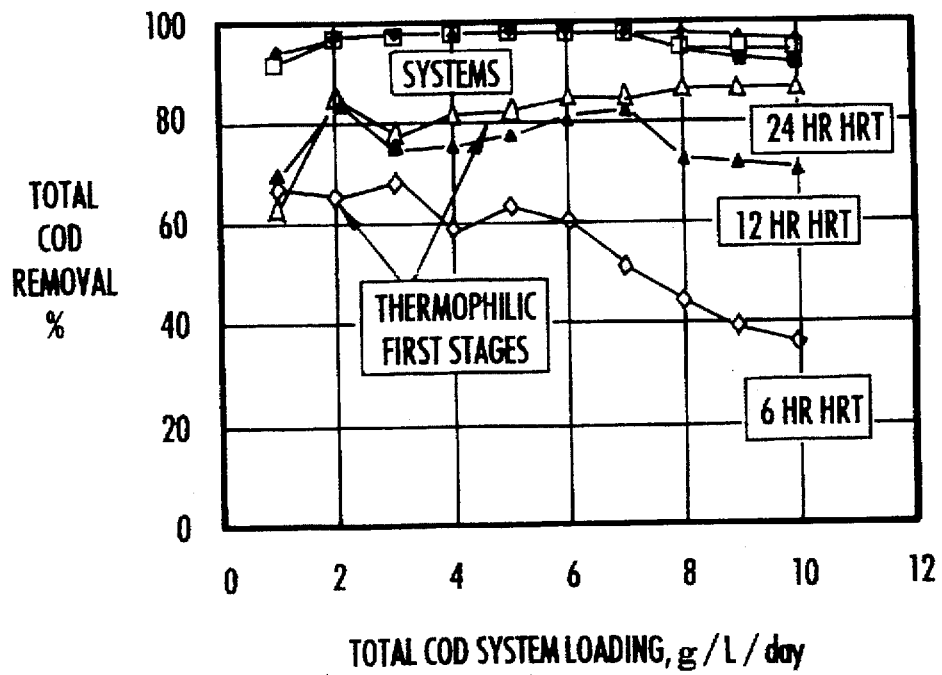
FIG. 6 is a graphical representation of the performance of the three systems illustrated in FIG. 5 at a 48 hr system HRT.

The three TPAB systems have been evaluated at the 48 hr system HRT. For the system consisting of a 24 hr HRT thermophilic reactor followed by a 24 hr HRT mesophilic reactor, total COD removals in excess of 98% were achieved at system organic loads ranging from 2 to 10 g COD/L/day (FIG. 6). For the system consisting of a 6 hr HRT thermophilic unit followed by a 42 hr HRT mesophilic unit, total COD removals in excess of 94% were achieved. Similar removals were achieved in the system consisting of a 12 hr HRT thermophilic reactor followed by a 36 hr HRT mesophilic reactor.

Figure 7:
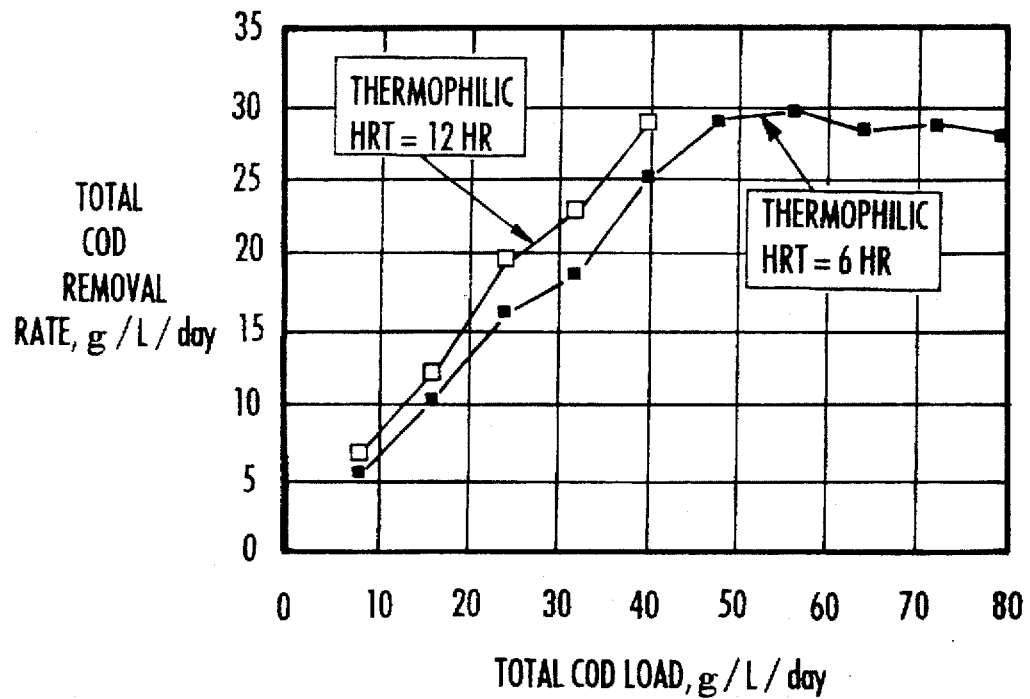
FIG. 7 is a graphical representation of the COD removal rates for the thermophilic stages of the systems at the 48 hr system HRT.

Comparing the thermophilic stages of the TPAB systems, it was observed that the 6 hr HRT thermophilic phase had reached maximum total COD removals at an effective loading of 48 g COD/L/day, as shown in FIG. 7. It was observed that although the maximum COD removal capacity for the 6 hr HRT thermophilic stage was reached, the overall two-phase system continued to perform well. The 12 hr HRT thermophilic stage was observed to have consistently higher COD removal rates than the 6 hr HRT thermophilic stage at effective organic loadings ranging from 8 to 40 g COD/L/day.

The methane production of the thermophilic and mesophilic units were observed separately. The 24 hr HRT thermophilic unit and the 12 hr HRT thermophilic unit were observed to have near equal methane production at system organic loading rates ranging from 1 to 5 g COD/L/day. The 6 hr HRT thermophilic unit had consistently lower methane production than the 24 or 12 hr HRT units. Saturation loading was evident for the 6 hr HRT thermophilic unit at the 7 g COD/L/day system loading, as methane production failed to increase with further increases in system loading.

Total methane production for both phases of the three TPAB systems was compared to theoretical methane production. Theoretical methane production is 0.35 liters at STP (14.7 psi, 0° C.) of methane produced per gram of COD destroyed. It was observed that there was no significant difference in total methane production between the three TPAB systems, and all systems compared closely to the theoretical methane production.

Studies are continuing at the 24 hr system HRT at system organic loadings ranging from 10 to 20 g COD/L/day, corresponding to influent COD concentrations of 10,000 mg/L to 20,000 mg/L. It is predicted that the shorter system HRT and the higher organic loadings will result in greater differences in performance between the three TPAB systems. This may reveal optimal size ratios between the thermophilic and mesophilic phases, leading to the most effective application of the TPAB process.

Conclusions from the studies of Example 2 are:
1. The "temperature-phased anaerobic biofilter" (TPAB) process is a promising new anaerobic treatment technology with the ability to achieve higher efficiencies of organic removals than is generally possible for single-stage anaerobic filter systems.
2. The TPAB process has been demonstrated to be effective at 24 hr and 48 hr system HRTs.
3. Nearly equal treatment performance at the 48 hr system HRT has been observed using three different reactor size ratios.

BIOFILTER MEDIA

In the temperature-phased anaerobic biofilter process, the biofilter media allows for efficient retention of the microorganisms within the contained reactor. The microorganisms have been shown in various research studies to attach to the media, and to be entrapped in the interstitial spaces between the media. The retention of microorganisms is very important in anaerobic treatment processes because the key group of organisms for waste stabilization, the methanogens, are known to be fairly slow-growing. Biofilter media may be of two general types. The first type is random packed media, in which usually polypropylene ring media is placed into the reactors. Various other types of materials have been used for random packing including rocks, ceramics, shells, and polyurethane foam blocks. The second type of biofilter media is modular vertical or cross-flow media, in which blocks of prefabricated media are placed inside of a reactor.

In the temperature-phased anaerobic biofilter demonstration experiment of Example 2, the media used is a random-pack polypropylene ring media. The media is fully-packed into the experimental reactors. The rings are 1.59 cm. (0.625 in.) plastic media. The random packing of this media provides a filter bed porosity of 0.89. The specific surface area of this media is 344 $m^2/m^3$, as reported by the manufacturer.

PROCESS VARIATIONS

The demonstration experiment of Example 2 involves the use of anaerobic biofilters with random-packed media. In addition to biofilters, other types of anaerobic reactor systems can be utilized in the temperature-phased anaerobic reactor process including suspended growth systems.

One important suspended growth system which may be utilized is the anaerobic sequencing batch reactor (U.S. Pat. No. 5,185,079) process, or ASBR. The ASBR is a batch-fed system in which the microorganisms are maintained in the reactor without attachment media. In the ASBR process, a series of steps take place for waste degradation including:

the feed step in which new liquid wastes enter into the reactor, the react step in which continuous or intermittent mixing is employed and waste stabilization takes place, the settle step where the organisms internally settle to the bottom of the reactor, and the decant step where the stabilized liquid effluent is removed. The series of these four steps is called a sequence, and numerous sequences may take place during a 24 hr period.

The temperature-phased anaerobic reactor process may be employed using two ASBRs connected in series, a thermophilic ASBR connected to a mesophilic ASBR, as defined by the process.

The temperature-phased anaerobic reactor process may also be employed using continuously or intermittently-mixed, continuously or intermittently-fed reactors. In this configuration, which is envisioned to be employed in a conventional municipal wastewater treatment plant, the wastes continuously enter the thermophilic first phase where important pathogen destruction can take place along with partial waste stabilization. The waste stream then passes to the mesophilic second phase for further stabilization.

EXAMPLE 3

This research was supported by a grant from the U.S. Department of Agriculture, contract number 91-34188-5943 (Charles D. Hungerford, Administrative Contact, and David R. MacKenzie, Programmatic Contact) through the Iowa Biotechnology Byproducts Consortium.

The purpose of this example was to compare the performance of the temperature-phased system with the conventional single-stage mesophilic system for treating domestic wastewater sludge. Of particular interest in the research was a comparison of the two systems from the standpoint of coliform reduction, volatile solids destruction, and biogas production.

The temperature-phased system achieved almost complete destruction of total and fecal coliforms over a range of SRTs from 10 to 15 days. The concentration of fecal coliform in the effluent from the temperature-phased system never exceeded 1000 MPN/g TS, which can meet CFR 40, Part 503 coliform requirements for Class A sludge.

The following requirements must be met for all six Class A pathogen alternatives:
1. Either the density of fecal coliforms in the biosolids must be less than 1000 most probable numbers (MPN) per gram total solids (dry-weight basis);
2. Or the density of *Salmonella sp.* bacteria in the biosolids must be less than 0.75 MPN per gram of total solids (dry-weight basis).

Either of these requirements must be met at one of the following times:
1. When the biosolids are used or disposed;
2. When the biosolids are prepared for sale or give-away in a bag or other container for land application; or
3. When the biosolids or derived materials are prepared to meet the requirements for exceptional quality biosolids.

At SRTs rangings from 10 to 15 days, the temperature-phased system achieved an 18 percent higher destruction of volatile solids and 16% more methane production than was possible with the single-stage mesophilic process.

The temperature-phased anaerobic waste treatment process developed by Dague and co-workers at Iowa State University [Harris, W. L., and Dague, R. R. (1993) Comparative Performance of Anaerobic Filters at Mesophilic and Thermophilic Temperatures. *Water Environmental Research*, Vol. 65, No. 6, 764–771; Kaiser, S. K., and Dague, R. R. (1994) The Temperature-Phased Anaerobic Biofilter Process. *Water Science and Technology*, Vol. 29, No. 9, 213–223; Steinbach, T. L. (1994) Laboratory Studies on the Temperature-Phased Anaerobic Sequencing Batch Reactor. Master's thesis, Library, Iowa State University, Ames, Iowa 50010] have been shown to achieve significantly greater organic removals than is possible for single-stage systems operated at either 55° C. or 35° C. Also, with the temperature-phased system, it is possible to operate at much higher loadings than is possible with the single-stage system [Kaiser, S. K., and Dague, R. R. (1994) The Temperature-Phased Anaerobic Biofilter Process. Water Science and Technology, Vol. 29, No. 9, 213–223]. The temperature-phased anaerobic system appears to combine the advantages of both mesophilic and thermophilic anaerobic processes while avoiding the disadvantages of each process.

The purpose of this study was to investigate the application of temperature-phased system to the treatment of domestic wastewater sludge. Specific objectives of the study were to determine the VS destruction and pathogen reduction capabilities of the temperature-phased system.

Experimental Systems

Figure 8:
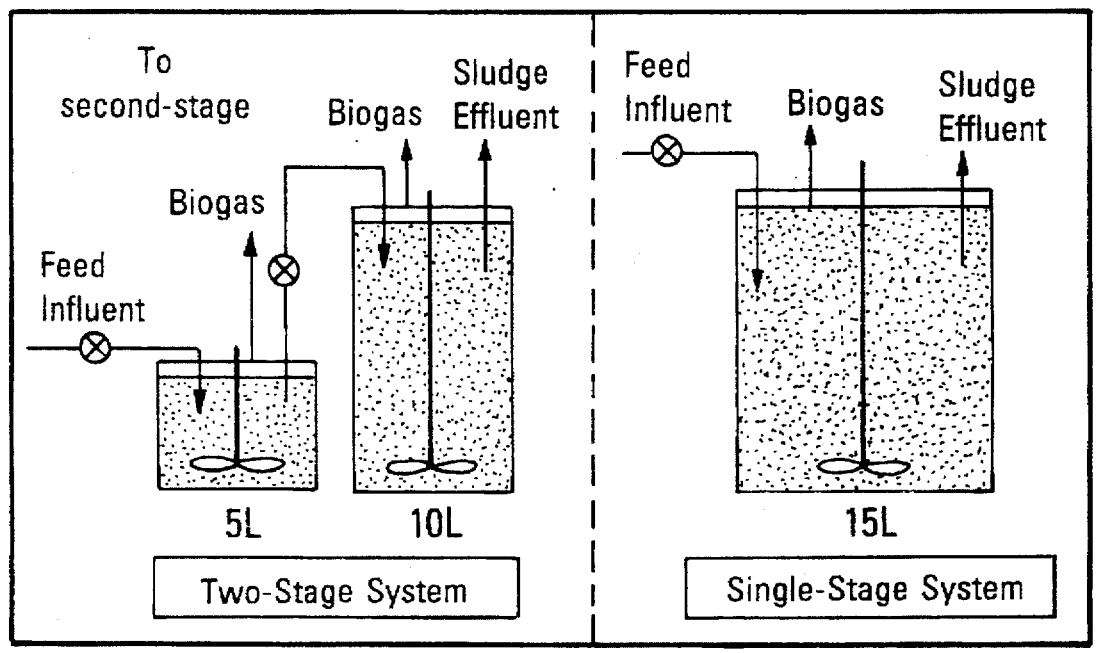
FIG. 8 is a schematic diagram of single and two-stage anaerobic digestion systems.

The temperature-phased system consisted of two, completely-mixed reactors operated in series. The first reactor (R1) had a working volume of five (5) liters. The second reactor (R2) had a working volume of ten (10) liters. Thus the total volume of the two-stage system was 15 liters. The mesophilic single-stage system (R3) also had a working volume of 15 liters. Both systems are illustrated in FIG. 8.

Operational Conditions

Both systems were set up in a room with a temperature of 35° C. A water bath was used to maintain the temperature of the first stage of the two-stage system at 55° C. All reactors were operated in a semi-continuous manner by feeding and withdrawing substrate from them 12 times per day. The SRT/HRTs and VS loadings for both systems are shown in Table 3.

Substrate

The substrate fed to the reactors was sludge from the primary clarifiers at the Ames, Iowa, Water Pollution Control Plant (WPCP). After collection and before feeding to the reactors, the sludge was screened with a No. 5 sieve (opening 4.00 mm) to avoid clogging of the tubing system. The raw sludge was stored in a refrigerator at 4° C. The characteristics of raw primary sludge are shown in Table 4.

System Start-Up

The two systems were seeded initially with digesting sludge from the mesophilic anaerobic digesters at the Ames, Iowa, WPCP. The thermophilic reactor was more difficult to start up and took a longer time than the mesophilic reactors. This is due to the comparatively low population of truly thermophilic microorganisms in the mesophilic seed sludge. The thermophilic unit was filled with mesophilic digesting sludge to the working volume and purged with methane. Initially, the reactor was operated at 35° C. and an SRT of 30 days (The corresponding VS loading rate is 1.33 g/l/d). One week later a significant amount of gas was being produced. At this time the temperature was raised from 35° C. to 55° C. over a two-hour period and the feeding rate was reduced to 0.5 g VS/l/d. Within the following week, no gas production was observed, but pH was in the range from 7.0 to 7.3 and the VFA concentrations were below 1000 mg/l, as acetic. At the end of the week, the reactor began to produce gas. It was then fed with raw sludge at an SRT of 30 days and a VS loading of 1.3 g/l/d. Twenty days later, the SRT was reduced to 20 days with a corresponding VS loading of 2 g/l/d. After the gas production increased, the SRT was further reduced to 5 days. Start-up of the reactors required a four-month period while holding the SRT for both systems at 15 days.

Sampling and Analytical Methods

A pseudo-steady state, defined as relatively constant VS reduction (±5%), was attained after 3–4 turnovers in the reactors. Samples were taken from the sampling ports of each reactor after it reached the pseudo-steady state. Total and fecal coliforms were chosen as indicators of the possible presence of pathogens. Measurement of pH, alkanility, total solids (TS), VS, VFA, COD, and coliforms followed Standard Method (American Public Health Association, 1980). Following the achievement of steady-state and data collection at the 15-day SRT, the SRT was lowered in both systems by increasing the feed sludge rate. Steady-state data were collected at each SRT/HRT after at least four hydraulic turnovers in the reactors.

TABLE 3

SRTs and Volatile Solids Loadings for the Single-Stage and Two-Stage Systems

| SRT/HRT | Volatile Solids Loadings, g VS/L/day | | |
|---|---|---|---|
| | | Two Stage* | |
| days | Single Stage | 1st Stage | 2nd Stage |
| 15 | 2.1 | 6.3 (5)** | 2.2 (10)** |
| 13.6 | 2.3 | 6.9 (4.5) | 2.5 (9.1) |
| 12.5 | 2.5 | 7.5 (4.2) | 2.8 (8.3) |
| 11.5 | 2.5 | 7.5 (3.8) | 2.9 (7.7) |
| 10.0 | 2.9 | 8.7 (3.3) | 3.6 (6.7) |

*The overall VS loading on the two-stage system is identical to the single-stage system.
**The SRT/HRT for each stage of the two-stage system are shown in parentheses.

TABLE 4

Characteristics of Ames primary sludge.

| Total Solids, % | 4.5–5.0 |
|---|---|
| Volatile Solids, % | 2.9–3.3 |
| Chemical Oxygen Demand, g/L | 50–65 |
| Total Coliforms, MPN/gTS | $10^7$–$10^8$ |
| Fecal Coliforms, MPN/gTS | $10^6$–$10^8$ |

RESULTS

VS Removal

Figure 9:
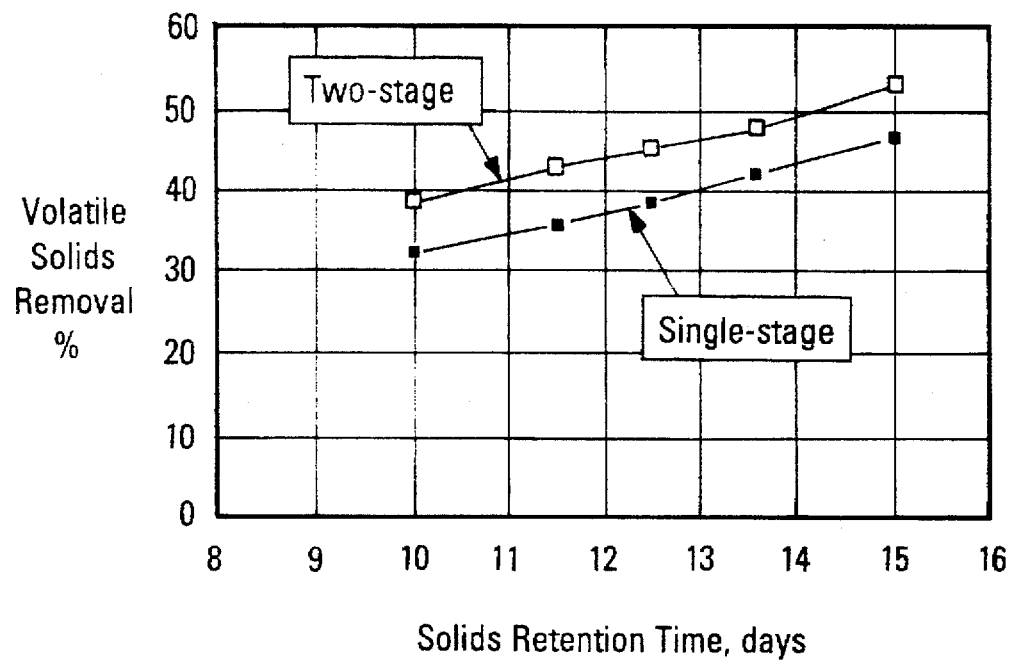
FIG. 9 is a graphical representation of volatile solids reductions for the single-stage and two-stage systems.

FIG. 9 illustrates the VS destruction for the single and two-stage systems for SRTs ranging from 15 to 10 days. Single-stage VS destruction ranged from 32.5% at the 10-day SRT to 46.8% at the 15-day SRT. Destruction of VS for the two-stage system ranged from 39.1% at the 10-day SRT to 53.2% at the 15-day SRT. On average, across the range of SRTs studied, the two-stage thermophilic/mesophilic system achieved about an 18 percent higher VS destruction than did the single-stage mesophilic system.

Total and Fecal Coliform Reductions

Figure 10:
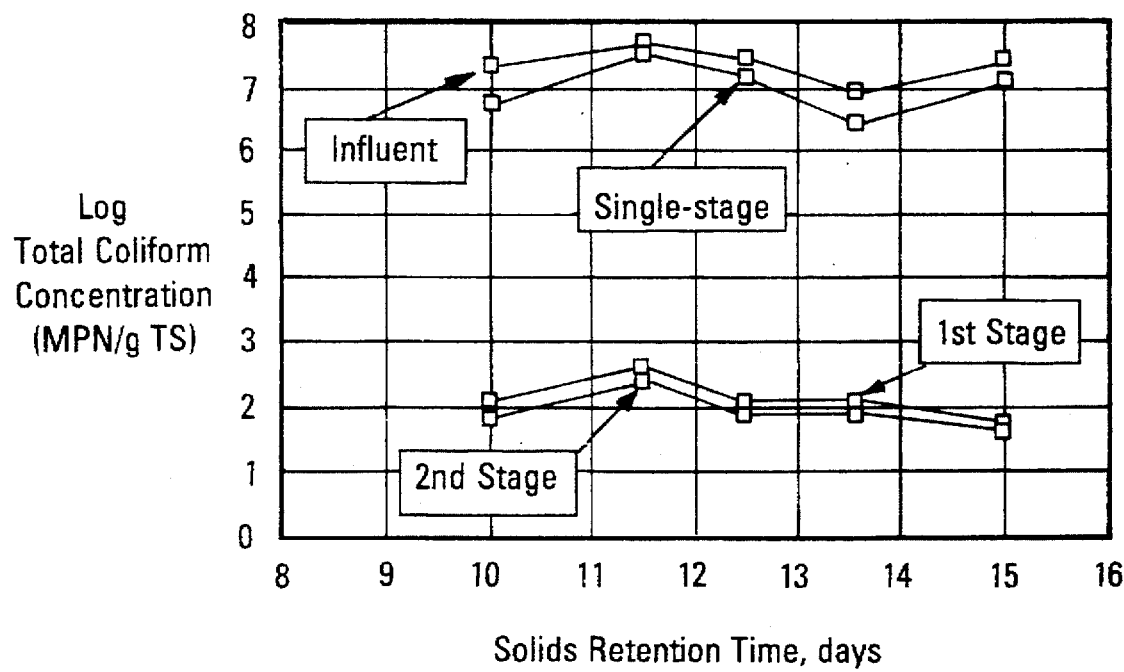
FIG. 10 is a graphical representation of total coliform reductions for the single-stage and two-stage systems.
Figure 11:
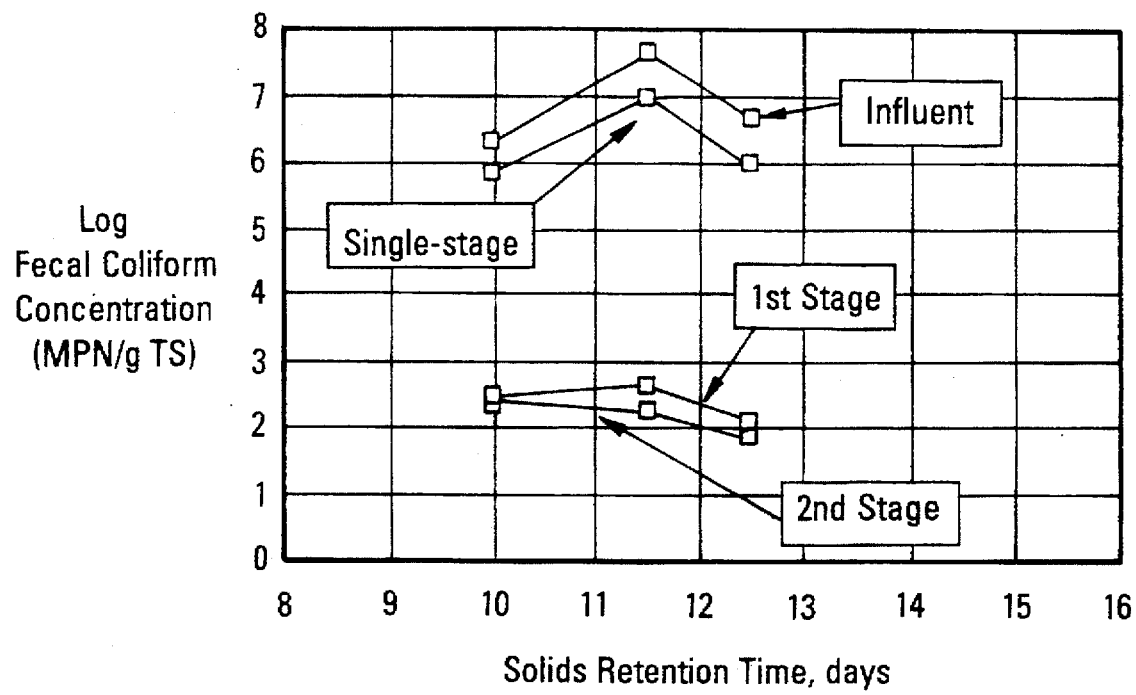
FIG. 11 is a graphical representation of fecal coliform reductions for the single-stage and two-stage systems.

Total and fecal coliform reductions for the single and two-stage systems at SRTs ranging from 10 to 15 days are illustrated in FIG. 10 and FIG. 11, respectively. The two stage-system greatly outperformed the single-stage system in terms of reductions in both total and fecal coliforms. The single-stage mesophilic reactor achieved only an average coliform reduction of 66%. A full-scale unit operated in this manner would not be capable of meeting the 40 CFR Part 503 regulations for Class A biosolids. In contrast, the temperature-phased system achieved an average 99.9998% reduction in coliforms. The highest fecal coliform concentration in the effluent from the two-stage system was only 310 MPN/g TS, which is well below the 1000 MPN/g TS required for Class A sludge under the 503 regulations.

Biogas Composition and Methane Production

Figure 13:
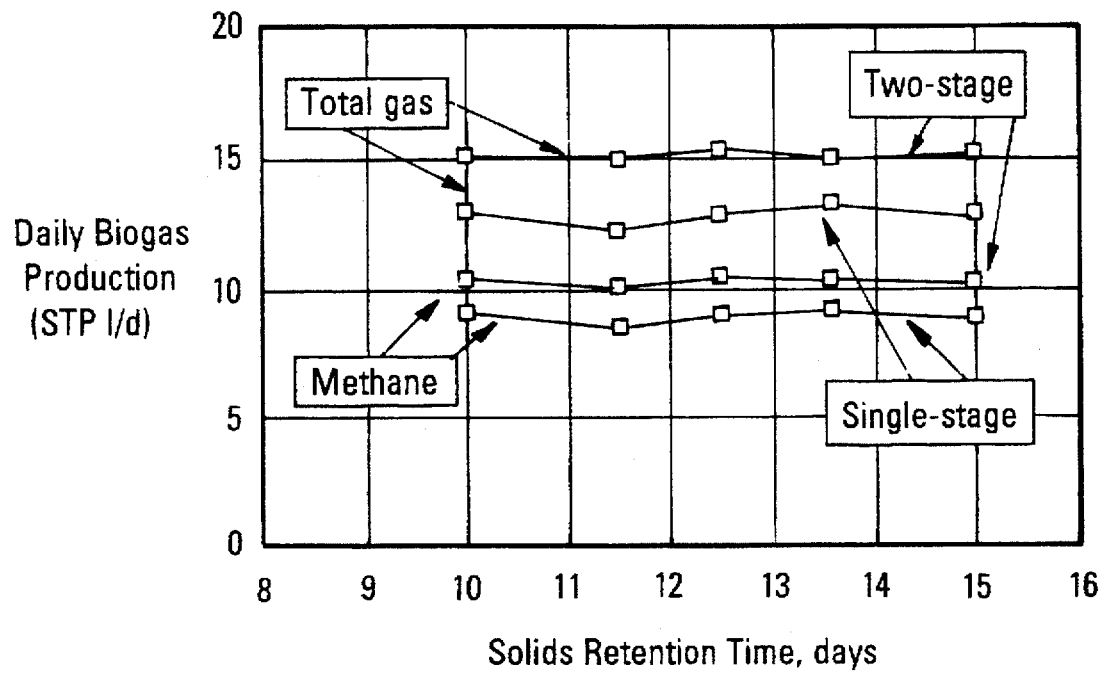
FIG. 13 is a graphical representation of daily biogas production of the single-stage and two-stage systems.

The biogas composition measured at different SRTs were not significantly different for each reactor. The single-stage mesophilic reactor and the second stage mesophilic reactor in the two-stage system had a composition of 67 to 71% methane, 24 to 27% carbon dioxide, and 4 to 7% nitrogen. The first stage (thermophilic) had a slightly lower methane content with a composition of 64 to 68% methane, 27 to 30% carbon dioxide, and 3 to 7% nitrogen. Daily methane production is shown in FIG. 13. The two-stage system achieved a methane production rate about 16% higher than that of the single-stage mesophilic reactor. The higher methane production of the two-stage system was due to its higher VS destruction. The methane production per gram VS for each reactor was nearly same, 0.61 liter $CH_4$@STP/g VS destroyed.

Volatile fatty acids, alkalinity, and pH

Figure 12:
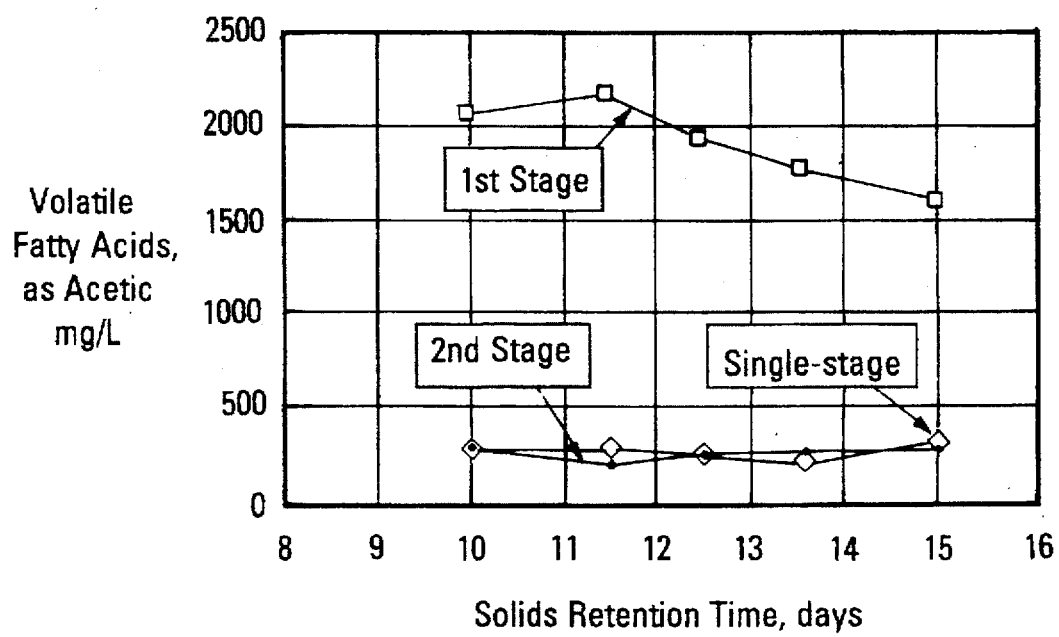
FIG. 12 is a graphical representation of volatile fatty acids concentrations in the single-stage and two-stage systems.

The VFAs, alkalinity, and pH in the second stage of the two-stage system were similar to those in the single-stage system. The VFAs varied from 180 to 300 mg/l (as acetic) and the alkalinity ranged from 5000 to 6100 mg/l, as $CaCO_3$, at all SRTs. The pH was in a range from 7.0 to 7.4. In general, a shorter SRT and a higher VS loading rate resulted in lower pH. The alkalinity and pH in the first-stage (thermophilic) of the two-stage system were not significantly different from those in mesophilic reactors. But the thermophilic unit always had a VFA 6 to 10 times higher than that in mesophilic reactors (FIG. 12). Usually a reduced SRT and an increased VS loading rate led to an increase in VFAs and a drop in pH. The two-stage system showed enough buffering capacity to maintain the pH in the range of 7.0 to 7.4 without addition of any buffering chemicals.

DISCUSSION

In this study, the startup procedure for the thermophilic unit was different from that reported previously [Garber, W. F., Ohara, G. T., Colbaugh, J. E., and Raksit, S. K. (1975) Thermophilic digestion at the Hyperion Treatment Plant. *Journal Water Pollution Control Federation*, 47, No. 5, 950–961; Rimkus et al. (1982) Full-scale thermophilic digestion at the West-Southwest Sewage Treatment Works, Chicago, Illinois. *Journal Water Pollution Control Federation*, 54, 1447]. As mentioned above, the start-up of thermophilic reactor took only four months, while one year has been commonly required using the approach of gradually increasing temperatures from the mesophilic to the thermophilic levels. With rapid temperature increases, as used in this research, the mesophiles are less likely to compete with organisms capable of adapting to thermophilic temperatures. The thermotolerant organisms (mesophiles capable of surviving at high temperatures) are likely to remain in the microbial population in significant numbers if slow increases in temperature are used during start-up. [Brock, T. D. (1986) Introduction: An overview of the thermophiles. Thermophiles, John Wiley and Sons, New York, N.Y., 1–16]. Such thermotolerant mesophiles may be more sensitive to temperature changes than the true thermophilic bacteria. This could lead to imbalances among the various groups involved in the anaerobic digestion process and result in the build-up of VFAs which, in turn, can lower the pH and adversely affect methanogenesis [Zinder, S. H. (1986) Thermophilic waste treatment systems, Thermophiles, John Wiley and Sons, New York, N.Y., 257–278]. Since only a very few thermophilic digesters are in operation in the U.S., thermophilic seed sludge is generally not available to aid in thermophilic reactor start-up. Thus the relatively quick start-up procedure for the thermophilic reactors using mesophilic, seed sludge and a rapid temperature increase, as in this research, is of significant practical importance.

As shown in FIG. 9, VS destruction is a function of SRT, as expected. Volatile solids destruction increases with increasing SRT. At all SRTs in the study, the two-stage system showed an increase VS removal rate of 18%, compared to the single-stage system. This is caused by the higher VS removal rate in the thermophilic stage of the two-stage system. In contrast, the coliform destruction is not significantly related to SRTs in the range studied. FIG. 10 and FIG. 11 illustrate the single-stage and the second stage of the temperature-phased system (both mesophilic) achieved only less than one log reduction of either total or fecal coliforms, while the first stage of the temperature-phased system (thermophilic) achieved a 5 to 6 log (99.999–99.9999%) reduction of both total and fecal coliforms. These results are consistent with previous research [Garber, W. F., Ohara, G. T., Colbaugh, J. E., and Raksit, S. K. (1975) Thermophilic digestion at the Hyperion Treatment Plant. *Journal Water Pollution Control Federation*, 47, No. 5, 950–961; Lee, K. M., Brunner, C. A., Farrel, J. B., and Eralp, A. E. (1989) Destruction of Enteric Bacteria and Viruses during Two-Phase Digestion. *Journal Water Pollution Control Federation*, Vol. 61, No. 8, 1421–1429]. This implies that the coliform reduction is mainly a function of temperature. In previous reports, SRTs greater than 10 days have been reported for thermophilic digestion [Garber, W. F., Ohara, G. T., Colbaugh, J. E., and Raksit, S. K. (1975) Thermophilic digestion at the Hyperion Treatment Plant. *Journal Water Pollution Control Federation*, 47, No. 5, 950–961; Lee, K. M., Brunner, C. A., Farrel, J. B., and Eralp, A. E. (1989) Destruction of Enteric Bacteria and Viruses during Two-Phase Digestion. *Journal Water Pollution Control Federation*, Vol. 61, No. 8, 1421–1429]. In this study, the SRT of the thermophilic unit was reduced to only 3.3 days, when the total system SRT was 10 days. As can be seen from FIG. 10 and FIG. 11, coliform destruction can be maintained to the same degree at this low SRT. The limit of SRT for high coliform destruction remains to be seen in future research. The highest fecal coliform concentration in the effluent from the temperature-phased system was only 310 MPN/g TS.

The main shortcoming of the temperature-phased anaerobic digestion system is the higher energy cost for heating the thermophilic stage. But this could be compensated for by its advantages. At the same VS removal rate, as shown in FIG. 9, the SRT for the two-stage system is nearly 2 days less than that for the single-stage system. The size of the two-stage system, therefore, can be reduced by at least 20%. Also, as illustrated in FIG. 13 the two-stage system was able to produce 16% more methane than the single-stage system. More energy can be recovered from the two-stage system, which compensates for the added energy requirements of thermophilic digestion.

Many conventional digesters now in the U.S. can not meet Class A requirement for biosolids disposal. With increasing growth and production of biosolids for treatment, there will be an increasing need to expand existing sludge stabilization systems. This study suggests a good alternative for solving these expansion problems. The conventional single-stage system can be easily modified to two-stage system by simply putting a thermophilic digester in front of the old digester. In practice, it would appear advisable to place an effluent heat exchanger on the first-stage thermophilic reactor. This approach will reduce; the temperature of the thermophilic effluent to the optimum mesophilic level and recover a significant part of the heat energy previously added to the thermophilic reactor influent.

Research is ongoing to determine the optimal volume ratio of the two-stage system for the treatment of combinations of primary sludge and wasted activated sludge. In the study reported herein, system SRTs less than 10 days were not attempted. An SRT of 10 days is generally considered to be minimum for mesophilic digestion to prevent washout of the key methanogenic bacteria [Dague, R. R., McKinney, R. E., and Pfeffer, J. T. (1970) Solids retention in anaerobic waste treatment systems. *Journal Water Pollution Control Federation*, 42, No. 2, Part 2, R29]. However, as shown in Table 3, the SRT for the thermophilic phase of the temperature-phased system was only 3.3 days when the system SRT was 10 days. Studies are continuing to determine the practical lower limit of SRT for the thermophilic first phase while maintaining sufficient coliform destruction to meet the 40 CFR Part 503 regulations for Class A biosolids. Recent experiments have shown that the thermophilic phase can be operated at an SRT of one day with the same degree of coliform reduction achieved at the longer SRTs of this study. However, such a short SRT in the thermophilic reactor of the two-stage system may not be the most efficient from an overall performance standpoint, considering VS destruction, biogas production, energy conservation, and operation and maintenance costs.

CONCLUSIONS

Based on this research, the following conclusions are evident:

1. The temperature-phased anaerobic digestion process is capable of achieving almost complete destruction of total and fecal coliforms over a range of SRTs from 10 to 15 days producing a digested sludge that meet CFR 40, Part 503 coliform requirements for Class A sludge.
2. At SRTs ranging from 10 to 15 days, the temperature-phased anaerobic digestion process is capable of achieving a 18% higher destruction of volatile solids than is possible for the single-stage mesophilic process. Similarly, methane production is 16% higher for the temperature-phased system.
3. The temperature-phased approach to domestic wastewater sludge digestion appears to offer the advantages of each of the thermophilic and mesophilic processes while avoiding the disadvantages of each process, particularly the odors associated with thermophilic digestion and the lower rates of solids destruction associated with mesophilic digestion.

EXAMPLE 4

This research was supported by a grant from the U.S. Department of Agriculture, contract number 91-34188-5943 (Winston Sherman, Administrative Contact, and H. Glenn Gray, Programmatic Contact) through the Iowa Biotechnology Byproducts Consortium.

The temperature-phased anaerobic process has been under development by Dague and coworkers at Iowa State University [Harris, W. L., and Dague, R. R. (1993) "Comparative performance of anaerobic filters at mesophilic and thermophilic temperatures," 65, 764–771; Kaiser, S. K., and Dague, R. R. (1994) "The temperature-phased anaerobic biofilter process." *Water, Science, and Technology*, Vol. 29, No. 9, 213–223; Han, Y., and Dague, R. R. (1995) "Laboratory studies on the temperature-phased anaerobic digestion of domestic wastewater sludge", *Proceedings of the 68th Annual Conference of the Water Environment Federation*, Miami Beach, Fla., Vol. 1, 135–143]. The temperature-phased process has been shown to achieve significantly higher organic removals than is possible for single-stage systems operated at either 55° C. or 35° C.

In a previous study by the Applicants on the digestion of primary wastewater sludge, the temperature-phased system was able to achieve much higher VS removals than was possible with single-stage mesophilic digestion and almost complete destruction of coliforms, producing Class A biosolids [Han, Y., and Dague, R. R. (1995) "Laboratory studies on the temperature-phased anaerobic digestion of domestic wastewater sludge", *Proceedings of the 68th Annual Conference of the Water Environment Federation*, Miami Beach, Fla., Vol. 1, 135–143]. Therefore, it is hypothesized the temperature-phased anaerobic digestion system could solve the problems associated with anaerobic digestion of mixtures of primary sludge (PS) and waste activated sludge (WAS). It is to be understood that the waste activated sludge is a biological sludge and other biological sludges can be treated similarly by the temperature-phased process.

The purpose of this study was to compare the performance of the temperature-phased (thermophilic/mesophilic) system with the conventional single-stage mesophilic system for treating mixtures of WAS and PS. Specific objectives of the research were to determine the VS reduction and pathogen destruction capabilities of the temperature-phased system.

The temperature-phased systems used in the laboratory study consisted of two, completely-mixed reactors operated in series. The first and second stages were operated at 55° C. and 35° C., respectively. The single-stage system was operated at 35° C. In this study, one single-stage system and two temperature-phased systems (System A and System B) were operated. Two-stage System A had a total working volume of 14 liters, with 4 liters in the first stage and 10 liters in the second stage. Two-stage System B had 10 liters in the second stage, but its first stage had a working volume of only 2 liters. The single-stage system had a working volume of 14 liters.

The single-stage and the second stages of the two-stage systems were seeded initially with digesting sludge from the mesophilic anaerobic digesters at the Marshalltown, Iowa, Water Pollution Control Plant (WPCP). The first stages were seeded with thermophilic digesting sludge available from ongoing research. The reactor feed was 50—50 volumetric mixtures of WAS and PS. Both the WAS and PS were obtained from the Marshalltown, Iowa, Water Pollution Control Plant. The WAS had an approximate total solids (TS) content of four percent. The TS content of the PS varied in a range from 3 to 5%, but was adjusted to 4% TS by either dewatering or dilution.

Start-up of the temperature-phased systems took one month while holding the SRT/HRT for both systems at 14 and 12 days, respectively. The start-up of the single-stage system at an SRT of 20 days suffered serious foaming and the system eventually failed. It was then decided to start the single-stage system at an SRT of 24 days. This time the system did not fail, but foaming was still severe. The SRT/HRT and volatile solids loadings applied to all three systems during this research are shown in Table 5.

TABLE 5

SRTs and Volatile Solids Loadings for the Single and Two-Stage Systems

| | Volatile Solids Loadings, g VS/L/day | | | | |
|---|---|---|---|---|---|
| | Single- | Two-Stage B | | Two-Stage A | |
| SRT/HRT | Stage | 1st Stage | 2nd Stage | 1st Stage | 2nd Stage |
| 11 | | 29 (1)* | 2.7 (10) | | |
| 12 | | 15 (2) | 2.5 (10) | | |
| 14 | | | | 7.3 (4) | 2.1 (10) |
| 17 | | 10.5 (2.7) | 2.2 (14.3) | | |
| 20 | | | | 5.3 (5.7) | 1.9 (14.3) |
| 24 | 1.2 | 7.3 (4) | 1.9 (20) | | |
| 28 | 1.1 | | | 3.8 (8) | 1.8 (20) |
| 34 | 0.9 | | | | |
| 40 | 0.8 | | | | |

*The SRT/HRT for each stage of the two-stage systems are shown in parentheses.

Figure 14:
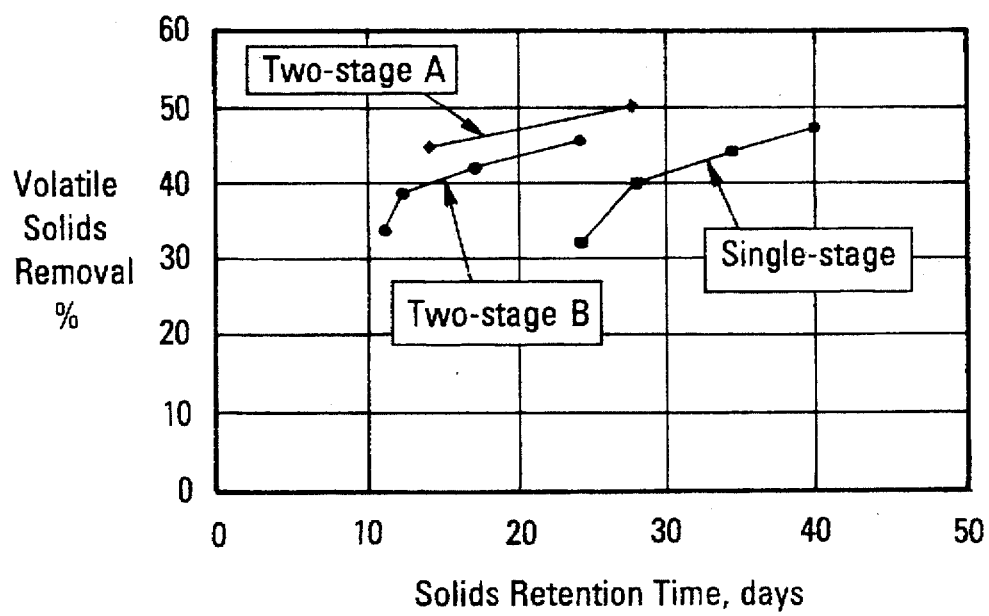
FIG. 14 is a graphical representation of volatile solid reductions for the single-stage and two-stage systems.

FIG. 14 shows the VS destruction for the single and two-stage systems for the different SRTs. The single-stage VS removal rate ranged from 32% at the 24-day SRT to 47% at the 40-day SRT. Volatile solids destruction for two-stage Systems A and B varied from 45% at the 14-day SRT and 34% at the 11-day SRT to 50% at the 28-day SRT and 45% at the 24-day SRT, respectively. For the same VS removal, the SRT required for the two-stage system was 40% of that required for the single-stage system. On average, both two-stage systems achieved the same or higher VS destruction, while the SRT applied was only one-half that for the single-stage system. In other words, the capacity was more than doubled by using the temperature-phased system without any deterioration in VS destruction. The increased capacity of the two-stage systems was due to the much higher reaction rate achieved at the higher temperature in the first thermophilic stage. The biogas ($CH_4$ and $CO_2$) production per unit volume of the two-stage system was proportionally higher than the single-stage system.

Figure 15:
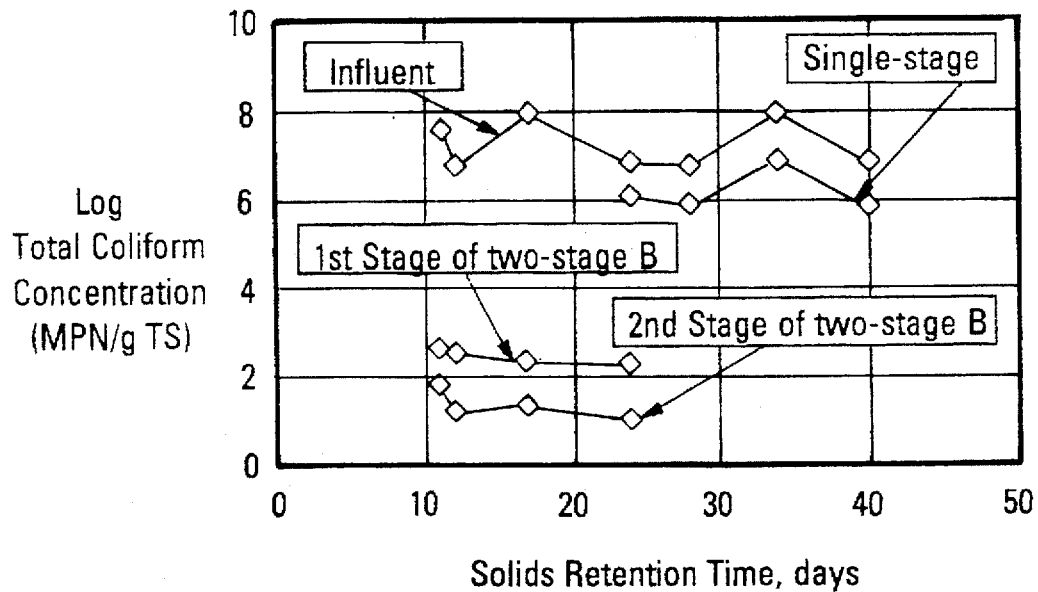
FIG. 15 is a graphical representation of fecal coliform reductions for the single-stage and two-stage systems.

The temperature-phased systems greatly outperformed the single-stage system in terms of both total and fecal coliform destruction. Fecal coliform destruction for the single and two-stage systems are shown in FIG. 15. The single-stage mesophilic system achieved only one log (90%) or less reduction in fecal coliforms. The digested sludge from the single-stage reactor could not meet Class A biosolids requirements (fecal coliforms less than 1000 MPN/g TS). In contrast, the temperature-phased system achieved an average six log reduction (99.9999%) in fecal coliforms. The effluent fecal coliform content was always far below 1000 MPN/g TS, the upper allowable limit to meet 40 CFR Part 503 regulations. Also, *Salmonella sp.* bacteria content in the effluent was below 0.75 MPN/gTS, the upper limit allowed to meet the criteria for Class A biosolids.

Figure 16:
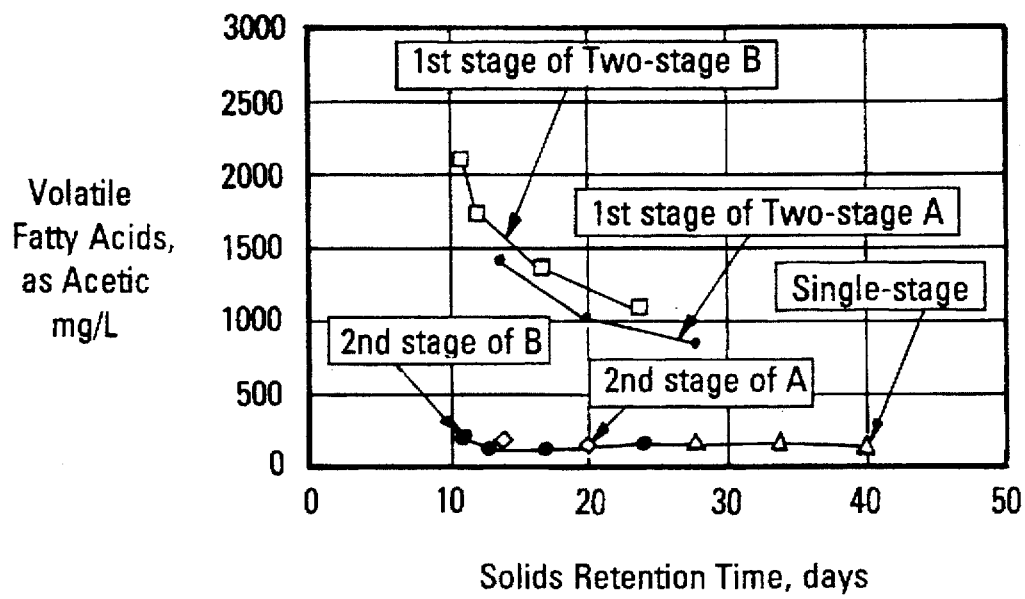
FIG. 16 is a graphical representation of volatile fatty acids concentration in the single-stage and two-stage systems.

FIG. 16 illustrates the variation in volatile fatty acids for the single-stage and two-stage systems over the range of SRTs investigated. Although the VFAs in the first thermophilic stages were always high (from about 800 to 2200 mg/L at the SRTs investigated), the VFAs in the second mesophilic stages were as low as that in the single-stage mesophilic anaerobic digestion system. Serious foaming in the single-stage mesophilic system was observed in an SRT range from 24 to 34 days, while nearly no foaming existed in both two-stage systems at all SRTs studied. The temperature-phased system combines the advantages of thermophilic digestion (higher rates of VS destruction, high coliform destruction, and reduced foaming) with the advantages of mesophilic digestion (lower VFAs and a less odorous digested sludge).

CONCLUSIONS

Based on this research, the following conclusions are evident:

1. The temperature-phased anaerobic digestion process is capable of achieving almost complete destruction of fecal coliforms over a range of SRTs from 11 to 28 days producing a digested sludge that meets 40 CFR, Part 503 coliform requirements for Class A sludge.
2. Although SRTs could be longer, the optimal SRT of the temperature-phased system exists in the range from 10 to 17 days. At those SRTs, the capacity of VS removal of the temperature-phased system was more than double that of the conventional single-stage system.
3. For equal volatile solids destruction when treating 50—50 mixtures of PS and WAS, the volume of the temperature-phased digestion system is approximately 40% of that required for single-stage mesophilic digestion.
4. The temperature-phased system applied to waste activated sludge digestion offers the advantages of each of the thermophilic and mesophilic processes while avoiding the disadvantages of each process, such as the odors and instability associated with thermophilic digestion and the lower rates of VS and pathogen destruction and serious foaming associated with mesophilic digestion.

EXAMPLE 5

Purpose of Research

The purpose of this research was to evaluate the application of the temperature-phased anaerobic waste treatment process to municipal solid wastes by means of laboratory-scale experiments.

Background

Legislation and standards making it more difficult and costly to dispose of municipal solid wastes in traditional landfills have been adopted by the U.S. Environmental Protection Agency and by most states in the U.S. This has prompted intense interest in alternatives to landfill disposal. Aerobic composting is being widely applied to the organic fraction of municipal solid wastes. According to data published in Biocycle (May 1991), there are over 1400 aerobic composting facilities in the United States. Anaerobic biological stabilization is an alternative to aerobic composting that has several significant advantages when applied to municipal solid waste. Anaerobic treatment results in the production of energy in the form of methane. Aerobic composting uses energy, primarily for mixing the composting material and the addition of air as a source of oxygen for the aerobic process. In addition, to be efficient, aerobic composting processes require the addition of nutrients (primarily nitrogen and phosphorus) and often generate offensive odors. Anaerobic methanogenic processes require much lower levels of nutrients and the reactor is sealed, eliminating the possibility of odors.

Conventional anaerobic digestion and aerobic composting achieve comparable results when applied to the organic fraction of domestic refuse [Golueke, C. G., "Biological Reclamation of Solid Wastes," Rodale Press, Emmaus, Pa., (1977)]. In both cases, one can expect a maximum volatile solids destruction in the 50 to 60 percent range. In the anaerobic process, six to eight cubic feet of biogas ($CH_4$+ $CO_2$) are produced for each pound of volatile solids destroyed in the process [Pfeffer, J. T., and J. C. Liebman, "Biological Conversion of Organic Refuse to Methane," Annual Report, NSF/RANN/Se/GI-39292/75/2, Dept. of Civil Engineering, Univ. of Illinois, Urbana, Ill. (1975)]. An important problem with the application of anaerobic digestion to municipal organic solid wastes has been the need to dilute the waste in order to achieve satisfactory mixing in the reactor. Recently, in order to avoid this problem, several researchers have studied what is called "high solids" anaerobic digestion [Magruder, G. C., R. E. Corder, E. C. Clausen, and J. L. Gaddy, "High Solids Digestion of Municipal Solid Waste to Methane by Anaerobic Digestion," Final Report ANL/CNSV-TM-196, U.S. Department of Energy, Argonne National Laboratory, Argonne, Ill. (1988)]. Magruder, et al., were able to achieve high rates of anaerobic digestion of municipal solid wastes (MSW) at feed solids concentrations as high as 30%.

Solids handling is a significant problem when dealing with the high-solids anaerobic processes just described. Operating the digestion system at a low feed solids concentration, commonly in the 10% to 12% range, greatly minimizes the problems of solid handling, mixing in the reactor, etc. The research described herein shows that the temperature-phased anaerobic process can greatly reduce the retention time in the system, thus making the dilution of the solid wastes into a slurry much less of a problem than is the case when dealing with anaerobic digestion at conventional mesophilic temperatures.

Research Procedure

This research involves the operation of two laboratory-scale reactor systems. System A is a single-stage reactor having an active volume of 15 liters and operates at a temperature of 35° C. System B is a two-stage system with the first stage containing a volume of five (5) liters being maintained at a temperature of 55° C.; and with the second stage containing an active volume of ten (10) liters being operated at a temperature of 35° C. Both systems are fed an identical solid waste material with the characteristics shown in Table 6. The synthetic solid wastes are diluted to achieve a 10% total solids content prior to feeding to the laboratory systems A and B. The composition of the synthetic solid waste is designed to simulate actual domestic solid wastes. The reactors are seeded initially with microorganisms from the anaerobic digesters at the City of Ames Water Pollution Control Plant.

TABLE 6

Characteristics of synthetic solid wastes fed to reactors.

| Component | Dry Solids % | Volatile Solids % | Weight in Feed % |
|---|---|---|---|
| White paper | 94.5 | 89.9 | 36 |
| Newspaper | 91.7 | 97.2 | 6 |
| Cardboard | 93.1 | 98.1 | 18 |
| Dog food | 91.5 | 91.4 | 20 |
| Plastics | 99.8 | 97.4 | 10 |
| Yard wastes | 50.5 | 80.1 | 10 |

Results and Discussion

Table 7 presents the volatile solids destruction that is expected for the single-stage mesophilic system, and for the two-stage thermophilic/mesophilic system.

TABLE 7

Volatile solids destruction at various solids retention times.

|  | Volatile Solids Destruction, % | |
| --- | --- | --- |
| Solids Retention Time (a) days | Single-Stage System | Two Stage System |
| 5 | (b) | 45.2 |
| 8 | (b) | 56.6 |
| 11 | 46.2 | 60.4 |
| 14 | 55.0 | 64.2 |
| 17 | 57.5 | 68.0 |
| 20 | 60.1 | (c) |

(a) Since the reactors are completely mixed, the solids retention time (SRT) is equal to the hydraulic retention time (HRT).
(b) This SRT is too short for the single-stage system.
(c) The two-stage system is not operated at the 20 day SRT.

From the data in Table 7, it can be seen that the solids retention time for equal volatile solids destruction in the two-stage (temperature-phased) system is approximately one-half of that of the single-stage mesophilic system. In essence, this means that the two-stage system would have-half the volume of the single-stage system, greatly reducing the capital costs for solid waste digestion system. It is also significant that the higher temperatures of the thermophilic system will result in the destruction of pathogenic microorganisms that are of concern when making use of biologically stabilized domestic solid wastes as soil conditioners.

EXAMPLE 6

Research Objective

The research is aimed at evaluating the temperature-phased anaerobic waste treatment process when applied to the stabilization of wastes from confinement swine feeding facilities through bioconversion to methane gas. The emphasis in the research is on stabilization of the solids (sludge) fraction from the swine manure.

Background

Over 80 million hogs are grown and slaughtered annually in the United States. A large and increasing number of these animals are farrowed and finished in confinement facilities. Major problems associated with such facilities relate to environmental concerns, particularly water and air pollution (odors). A common approach to swine waste stabilization is the application of anaerobic digestion processes. The anaerobic process converts organic matter to methane and carbon dioxide in the complete absence of oxygen. Previous applications of anaerobic digestion to swine wastes have generally involved completely-mixed or plug-flow reactors that are often heated or lagoons that are unheated. The basic problem with these systems is the relatively long detention times, commonly in the range of 20 to 30 days.

Research Results

This research is conducted using swine wastes from the Iowa State University Swine Nutrition Farm. The animals in the facility are in the weight range of 100 to 200 lb during the study. Two laboratory-scale anaerobic systems (A and B) are fed swine wastes having the characteristics shown in Table 8.

TABLE 8

Range in characteristics of raw swine manure and blended feed.

| Characteristics | Raw Waste | Blended Feed (a) |
| --- | --- | --- |
| Total solids, % | 18–26 | 5.3–7.2 |
| Volatile solids, % | 15–24 | 4.6–7.0 |
| Chemical oxygen demand, g/L | 210–340 | 64–102 |
| Five-day BOD, g/L | 73–80 | 22–24 |
| pH | 4.7–5.8 | 6.2–6.4 |
| Total Kjeldahl Nitrogen, g/L (as N) | 13–15 | 3.8–4.6 |

(a) The blended feed was made by diluting the raw waste by a factor of four. This generally involved the addition of 1,500 grams of raw waste to five liters of tap water.

System A is a single-stage, completely mixed reactor having an active volume of 15 liters that is maintained at a temperature of 35° C. System B is a two-stage system with the first-stage reactor having an active volume of five (5) liters and is operated at a temperature of 55° C. The second-stage reactor has a volume of ten (10) liters and is operated at a temperature of 35° C. The total active volume of each system is 15 liters.

The systems are operated over a range of solids and hydraulic retention times (SRT and HRT). Since the reactors are completely mixed, the SRT and HRT values were equal. The raw swine waste fed to the reactors has a total and volatile solids content of 7.0% and 6.0%, respectively. The SRT/HRT values, volatile solids loadings, and volatile solids destruction percentages are shown in Table 9.

TABLE 9

Retention time, volatile solids loadings, and volatile solids destruction

|  |  | Volatile Solids Destruction, % | |
| --- | --- | --- | --- |
| SRT/HRT days | System Volatile Solids Load, G/L/day | Single-Stage System | Two Stage System |
| 5 | 12.0 | (a) | 45.2 |
| 8 | 7.5 | (a) | 56.6 |
| 11 | 5.5 | 46.2 | 60.4 |
| 14 | 4.3 | 55.0 | 64.2 |
| 17 | 3.5 | 57.5 | 68.0 |
| 20 | 3.0 | 60.0 | 70.2 |

(a) Single-stage system could not be operated at this SRT/HRT and volatile solids loading.

Figure 17:
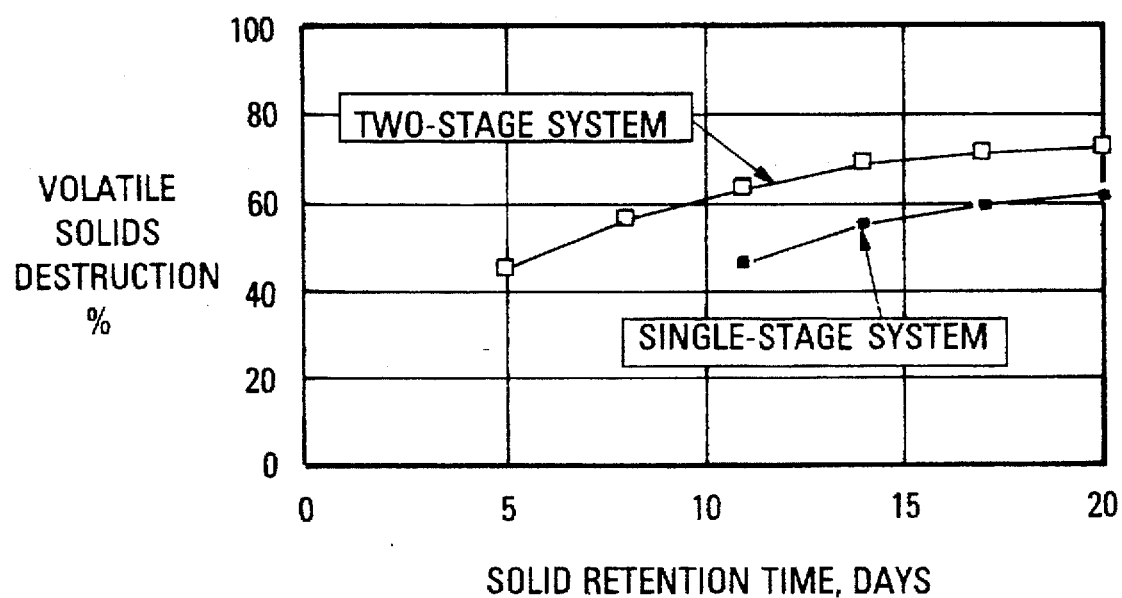
FIG. 17 is a graphical representation of volatile solids destruction at various solids retention times for the single-stage and two-stage systems treating swine wastes.

The data in Table 9 are plotted in FIG. 17. As shown, the two-stage (temperature-phased) system achieves considerably higher levels of volatile solids destruction than did the single-stage (mesophilic) system. Methane production is also higher for the two-stage system, generally in proportion to the increased volatile solids destruction that is achieved for the two-stage system.

These studies indicate that the temperature-phased anaerobic waste treatment process, is capable of achieving a much higher destruction of volatile solids in swine wastes than has been observed in previous research. [Taiganides, E. P., Baumann, E. R., Johnson, H. P., and Hazen, T. E., "Anaerobic Digestion of Hog Wastes." "*Journal Agricultural Engineering, Research*, 8, 4, pp 327–333, 1963; Hobson, P. N., and Shaw, B. G., "The Anaerobic Digestion of Waste from an Intensive Pig Unit." *Water Research*, 7, pp 437–449, 1973; Dague, R. R., and Pidaparti, S. R., "Anaerobic Sequencing Batch Reactor Treatment of Swine Wastes." Proceedings, 46th Purdue Industrial Waste Conference, Purdue University, West Lafayette, Id.].

Table 10 below summarizes the ranges for solids/hydraulic retention times for various waste sources.

TABLE 10

TEMPERATURE-PHASED WASTE TREATMENT PROCESS
Minimum and Maximum Solids/Hydraulic Rentention Times

| WASTE SOURCE | Ranges of Retention Times, Days | | |
|---|---|---|---|
| | Thermophilic | Mesophilic | Overall |
| Primary Sludge: | 1 | 14 | 15 |
| | 5 | 10 | 15 |
| Waste Activated Sludge | 1 | 19 | 20 |
| and PS + WAS mix: | 8 | 12 | 20 |
| Livestock Wastes: | 2 | 18 | 20 |
| | 8 | 12 | 20 |
| Solid Wastes: | 2 | 18 | 20 |
| | 8 | 12 | 20 |

While only certain preferred embodiments of this invention have been shown and described by way of illustration, many modifications will occur to those skilled in the art and it is, therefore, desired that it be understood that it is intended herein to cover all such modifications that fall within the true spirit and scope of this invention.

We claim:

1. A method of treating a waste stream, comprising the steps of:

feeding the waste stream into a thermophilic anaerobic reactor;

maintaining thermophilic anaerobic reaction conditions of the waste stream in the thermophilic anaerobic reactor for a predetermined hydraulic retention time to generate a first biogas effluent comprising methane and a first liquid effluent;

feeding the first liquid effluent from the thermophilic anaerobic reactor into a mesophilic anaerobic reactor; and maintaining mesophilic anaerobic reaction conditions of the waste stream in the mesophilic anaerobic reactor for a predetermined hydraulic retention time to generate a second biogas effluent comprising methane and a second liquid effluent.

2. The method of claim 1 wherein the thermophilic reaction conditions include a reaction temperature ranging from about 45° C. to about 75° C.

3. The method of claim 2 wherein the thermophilic reaction conditions include a reaction temperature of about 56°.

4. The method of claim 1 wherein the mesophilic reaction conditions include a reaction temperature ranging from about 20° C. to about 45° C.

5. The method of claim 4 wherein the mesophilic reaction conditions includes a reaction temperature of about 35° C.

6. The method of claim 1 wherein the thermophilic anaerobic reactor includes a fully-packed column.

7. The method of claim 1 wherein the mesophilic anaerobic reactor includes a fully-packed column.

8. The method of claim 6 wherein the mesophilic anaerobic reactor includes a fully-packed column.

9. The method of claim 1 wherein the thermophilic anaerobic reactor is a hybrid column including an unpacked blanket zone and a packed zone.

10. The method of claim 1 wherein the mesophilic anaerobic reactor is a hybrid column including an unpacked blanket zone and a packed zone.

11. The method of claim 9 wherein the mesophilic anaerobic reactor is a hybrid column including an unpacked blanket zone and a packed zone.

12. The method of claim 1 wherein the thermophilic anaerobic reactor is a suspended growth system.

13. The method of claim 1 wherein the mesophilic anaerobic reactor is a suspended growth system.

14. The method of claim 12 wherein the mesophilic anaerobic reactor is a suspended growth system.

15. The method of claim 8 wherein the fully-packed columns are packed with random-packed media.

16. The method of claim 8 wherein the fully-packed columns are packed with modular media.

17. The method of claim 11 wherein the packed zones are packed with random-packed media.

18. The method of claim 11 wherein the packed zones are packed with modular media.

19. The method of claim 1 wherein the waste stream is liquid waste.

20. The method of claim 19 wherein the hydraulic retention time in the thermophilic reactor is up to about 1 day, and the hydraulic retention time in the mesophilic reactor is up to about 2 days.

21. The method of claim 1 wherein the waste stream is a sludge.

22. The method of claim 21 wherein the sludge is primary sludge.

23. The method of claim 22 wherein the hydraulic retention time in the thermophilic reactor is up to about 5 days, and the hydraulic retention time in the mesophilic reactor is up to about 15 days.

24. The method of claim 21 wherein the sludge is a biological sludge.

25. The method of claim 24 wherein the hydraulic retention time in the thermophilic reactor is up to about 10 days, and the hydraulic retention time in the mesophilic reactor is up to about 20 days.

26. The method of claim 21 wherein sludge is formed from livestock waste.

27. The method of claim 26 wherein the hydraulic retention time in the thermophilic reactor is up to about 10 days, and the hydraulic retention time in the mesophilic reactor is up to about 20 days.

28. The method of claim 21 wherein sludge is formed from domestic solid waste.

29. The method of claim 28 wherein the hydraulic retention time in the thermophilic reactor is up to about 10 days, and the hydraulic retention time in the mesophilic reactor is up to about 20 days.

* * * * *

REEXAMINATION CERTIFICATE (4100th)

United States Patent [19]
Dague et al.

[11] B1 5,746,919
[45] Certificate Issued Jun. 6, 2000

[54] TEMPERATURE-PHASED ANAEROBIC WASTE TREATMENT PROCESS

[75] Inventors: Richard R. Dague, Ames, Iowa; William L. Harris, Gilbert, Ariz.; Sandra K. Kaiser, Cincinnati, Ohio

[73] Assignee: Iowa State University Research Foundation, Inc., Ames, Iowa

Reexamination Request:
No. 90/005,454, Aug. 17, 1999

Reexamination Certificate for:
Patent No.: 5,746,919
Issued: May 5, 1998
Appl. No.: 08/656,607
Filed: May 31, 1996

Related U.S. Application Data

[63] Continuation-in-part of application No. 08/316,860, Oct. 3, 1994, Pat. No. 5,525,228, which is a continuation of application No. 08/124,871, Sep. 23, 1993, abandoned.

[51] Int. Cl.[7] .................................................. C02F 11/04
[52] U.S. Cl. .......................... 210/603; 210/612; 210/617
[58] Field of Search .................................. 210/603, 612, 210/616, 617

[56] References Cited

U.S. PATENT DOCUMENTS

| | | | |
|---|---|---|---|
| 4,321,141 | 3/1982 | Messing | 210/603 |
| 4,351,729 | 9/1982 | Witt | 210/603 |
| 4,551,250 | 11/1985 | Morper et al. | 210/603 |
| 4,735,724 | 4/1988 | Chynoweth et al. | 210/603 |
| 5,228,995 | 7/1993 | Stover | 210/603 |

OTHER PUBLICATIONS

Mitsdörffer, 1990, Stabilization and Disinfection of Sewage Slude by Two–Stage Anaerobic Thermophilic/mesophilic Digestion.

Mitsdörfer, 1990, Zweistufig–thermophile/mesophile Faulung.

Perot et al. 1989, Optimisation of Sludge Anaerobic Digestion by Separation of Hydrolysis–Acidification and Methanogenesis.

Oles et al., 1997, Full Scale Experience of Two Stage Thermophilic/Mesophilic Sludge Digestion.

References from 12th Annual Residuals and Biosolids Management Conference.

*Primary Examiner*—Thomas Wyse

[57] ABSTRACT

A method of treating a waste stream including the steps of feeding the stream through a thermophilic anaerobic reactor and then a mesophilic anaerobic reactor operated in series.

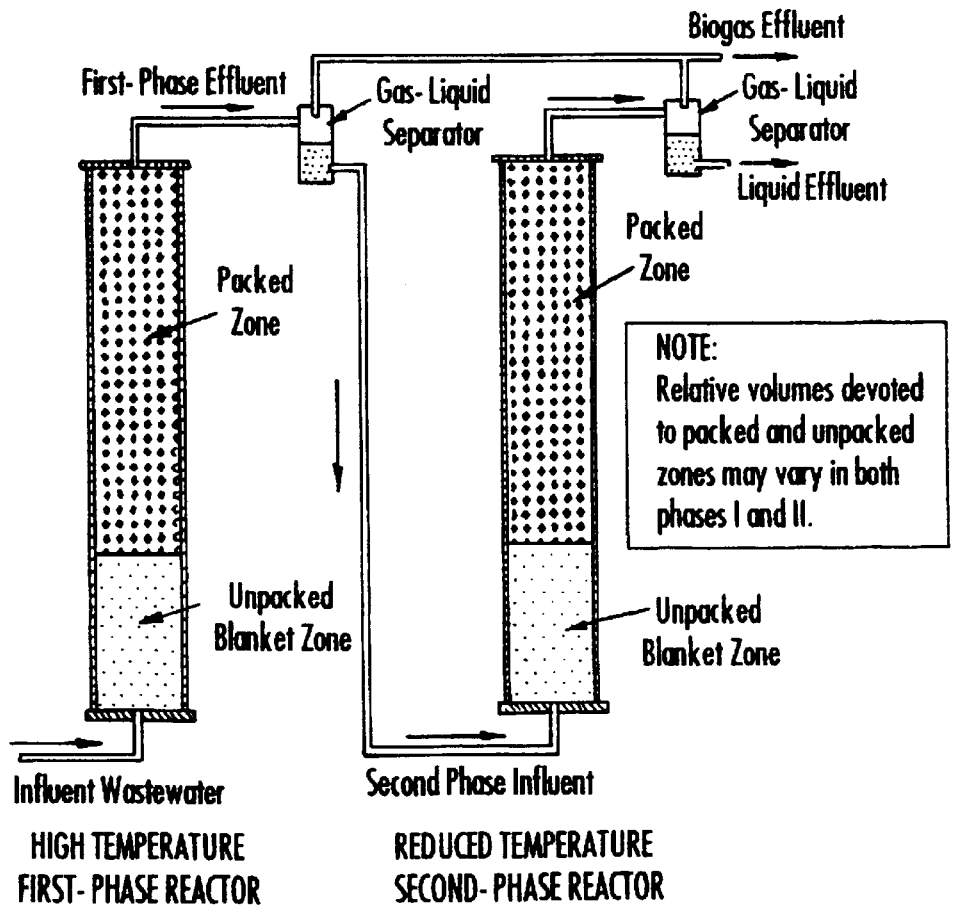

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2–29 dependent on an amended claim, are determined to be patentable.

1. A method of treating a waste stream comprising the steps of:

feeding the waster stream into a thermophilic anaerobic reactor *which includes a column selected from the group consisting of a fully-packed column and a hybrid column*;

maintaining thermophilic anaerobic reaction conditions of the waste stream in the thermophilic anaerobic reactor for a predetermined hydraulic retention time to generate a first biogas effluent comprising methane, and a first liquid effluent;

feeding the first liquid effluent from the thermophilic anaerobic reactor into a mesophilic anaerobic reactor *which includes a column selected from the group consisting of a fully-packed column and a hybrid column;* and maintaining mesophilic anaerobic reaction conditions of the waste stream in the mesophilic anaerobic reactor for a predetermined hydraulic retention time to generate a second biogas effluent comprising methane and a second liquid effluent.

* * * * *